United States Patent
Ohara et al.

(10) Patent No.: US 8,481,219 B2
(45) Date of Patent: Jul. 9, 2013

(54) FUEL CELL SYSTEM AND OPERATION METHOD THEREOF

(75) Inventors: Hideo Ohara, Osaka (JP); Akinari Nakamura, Osaka (JP); Masataka Ozeki, Osaka (JP); Yoshikazu Tanaka, Osaka (JP); Akinori Yukimasa, Osaka (JP)

(73) Assignee: Panasonic Corporation, Osaka (JP)

( * ) Notice: Subject to any disclaimer, the term of this patent is extended or adjusted under 35 U.S.C. 154(b) by 1502 days.

(21) Appl. No.: 11/883,813

(22) PCT Filed: Feb. 16, 2006

(86) PCT No.: PCT/JP2006/302706
§ 371 (c)(1),
(2), (4) Date: Aug. 7, 2007

(87) PCT Pub. No.: WO2006/088077
PCT Pub. Date: Aug. 24, 2006

(65) Prior Publication Data
US 2008/0160361 A1    Jul. 3, 2008

(30) Foreign Application Priority Data
Feb. 18, 2005   (JP) .................................. 2005-043261

(51) Int. Cl.
*H01M 8/04* (2006.01)
(52) U.S. Cl.
USPC ............ 429/429; 429/443; 429/446; 429/444
(58) Field of Classification Search
USPC .................................. 429/429, 443, 446, 444
See application file for complete search history.

(56) References Cited

U.S. PATENT DOCUMENTS

| | | | |
|---|---|---|---|
| 2002/0182456 A1* | 12/2002 | Condit et al. ................... | 429/13 |
| 2003/0104711 A1 | 6/2003 | Nakamura et al. | |
| 2004/0001980 A1 | 1/2004 | Balliet et al. | |

FOREIGN PATENT DOCUMENTS

| | | |
|---|---|---|
| JP | 11-191426 | 7/1999 |
| JP | 2002-154807 | 5/2002 |
| JP | 2002-352839 | 12/2002 |
| JP | 2003-229149 | 8/2003 |
| JP | 2003-229156 | 8/2003 |
| JP | 2003-282114 | 10/2003 |
| JP | 2005-122977 | 5/2005 |
| WO | WO 2005/020359 A1 | 3/2005 |

OTHER PUBLICATIONS

Extended European Search Report issued in European Patent Application No. EP 06 71 3847 dated Oct. 6, 2009.

* cited by examiner

*Primary Examiner* — Helen O Conley
(74) *Attorney, Agent, or Firm* — McDermott Will & Emery LLP

(57) ABSTRACT

A fuel cell system and an operation method thereof are provided, which are capable of properly executing special shutdown of the fuel cell system in the event of a trouble in purge operation by use of material gas. In the fuel cell system (100), if an abnormality occurs in a purge process by use of material gas during shutdown of the fuel cell system (100), the controller (11) brings, according to the contents of the abnormality, the opening/closing state of fuel electrode opening/closing devices (26, 23, 24) for opening and closing the outlet/inlet of a fuel electrode (13a), oxidant electrode opening/closing devices (25, 28, 20, 27) for opening and closing the outlet/inlet of an oxidant electrode (13c) or hydrogen generator opening/closing devices (21, 23, 22) for opening and closing the outlet/inlet of a hydrogen generator (12) into a state that is different from their opening/closing state when the purge process by use of the material gas is performed.

17 Claims, 6 Drawing Sheets

FUEL CELL SYSTEM AND OPERATION METHOD THEREOF

RELATED APPLICATIONS

This application is the U.S. National Phase under 35 U.S.C. §371 of International Application No. PCT/JP2006/302706, filed on Feb. 16, 2006, which in turn claims the benefit of Japanese Application No. 2005-043261, filed on Feb. 18, 2005, the disclosures of which Applications are incorporated by reference herein.

TECHNICAL FIELD

The present invention relates to a fuel cell system and an operation method thereof and more particularly to an improved technique of intra-system feed control of a material gas during a shutdown operation of a fuel cell system.

BACKGROUND ART

A known fuel cell system has a fuel cell for generating electric power by consuming hydrogen-rich reformed gas (fuel gas) at a fuel electrode and oxygen gas at an oxidant electrode; a blower for supplying oxygen gas to the oxidant electrode; a hydrogen generator for generating the reformed gas from a material gas (e.g., city gas or natural gas) and vapor through the steam reforming reaction; a water removing device for condensing vapor contained in the reformed gas (off gas) that has not been consumed at the fuel cell electrode; and a burner (heating combustor) for heating the reforming catalyst of the fuel generator through heat exchange with fuel gas obtained by combusting the off gas.

Generally, during shutdown of the fuel cell system, occurrence of abnormal combustion of a mixed gas comprising air and the fuel gas is properly restrained by purging the inside of the fuel cell system with an inert gas (e.g., nitrogen gas).

The purge process by use of nitrogen gas, however, requires provision of a special nitrogen system such as a nitrogen cylinder or nitrogen segregation/generation system. This nitrogen system reveals disadvantages in terms of both cost reduction and size reduction of the fuel cell system, especially in cases where the fuel cell system is used as a fixed-type distributed power generation system for household use or a power source for electric vehicles.

As attempts to solve the above problem, there have been proposed several techniques according to which the inside of the fuel cell system is purged with a material gas instead of nitrogen gas upon shutdown of the fuel cell system.

One known purging technique is such that desulfurized gas (a material gas from which sulfur is removed) that has passed through a bypass passage is guided into the fuel cell to purge the fuel cell with the material gas (see Patent Document 1 that is a prior art technique).

In another known purging technique, after vapor is guided into the inflammable gas system of a fuel cell system to thereby purge inflammable gas dwelling therein, a material gas is guided into the inflammable gas system to purge vapor upon a drop in the temperature of the catalyst of the hydrogen generator (fuel reformer) to a sufficient degree (see Patent Document 2 that is a prior art technique).

Patent Document 1: Japanese Patent Application Laid-Open Publication No. 2003-229149

Patent Document 2: Japanese Patent Application Laid-Open Publication No. 2003-282114

DISCLOSURE OF THE INVENTION

Problems that the Invention Intends to Solve

A fuel cell system that employs a purge technique with a material gas has several shutdown operation modes which include: a normal fuel cell system shutdown mode; an emergency shutdown mode for shutting down the fuel cell system in the event of a leak of inflammable gas or abnormalities in the internal pressure of the fuel cell system; and a special shutdown mode for shutting down the fuel cell system in the event of troubles in purging operation by use of a material gas such as failure of the material gas flow meter and interruption of supply pressure from the material gas supply source.

The prior art purge techniques by use of a material gas, however, are designed in consideration of only the normal fuel cell system shutdown mode and pay no attention to the circumstances of the special shutdown mode.

Therefore, if the fuel cell system in the special shutdown mode is stopped according to the known purge techniques by use of a material gas, the internal pressure of the fuel cell system (e.g., the hydrogen generator and the fuel cell) rapidly becomes negative owing to the dew condensation of vapor existing in the fuel cell system. The inventors think that, in the worst case, the negative internal pressure may possibly damage the components of the fuel cell system.

The present invention is directed to overcoming the foregoing problems and a primary object of the invention is therefore to provide a fuel cell system and an operation method thereof which are capable of properly executing special shutdown of the fuel cell system in the event of troubles in purge operation by use of a material gas.

Means of Solving the Problems

The above problems can be solved by a fuel cell system according to the invention which comprises: a fuel cell for generating electric power, using hydrogen gas at a fuel electrode and oxidizing gas at an oxidant electrode; a hydrogen generator for generating the hydrogen gas from a material gas to feed to the fuel electrode; an oxidizing gas feeder for feeding the oxidizing gas to the oxidant electrode; a material gas feed passage for guiding the material gas into at least the hydrogen generator; a fuel electrode opening/closing device for opening and closing the outlet and inlet of the fuel electrode; an oxidant electrode opening/closing device for opening and closing the outlet and inlet of the oxidant electrode; a hydrogen generator opening/closing device for opening and closing the outlet and inlet of the hydrogen generator; and a controller for controlling opening and closing of the fuel electrode opening/closing device, the hydrogen generator opening/closing device and the oxidant electrode opening/closing device, wherein, during shutdown operation of the fuel cell system, the controller is configured to bring the opening/closing state of at least one of the fuel electrode opening/closing device, the hydrogen generator opening/closing device and the oxidant electrode opening/closing device into a first state where the inside of at least one of the fuel electrode, the hydrogen generator and the oxidant electrode is communicated with the material gas feed passage and the atmosphere through the outlet/inlet thereof so as to allow a through-flow of the material gas, such that the inside of at least one of the fuel electrode, the hydrogen generator and the oxidant electrode is purged with the material gas of the material gas feed passage; and the controller is configured to bring the opening/closing state of at least one of the fuel electrode opening/closing device, the hydrogen generator opening/closing device and the oxidant electrode opening/closing device into a second state where the inside of at least one of the fuel electrode, the hydrogen generator and the oxidant electrode is not communicated with the atmosphere but communicated with the material gas feed passage through the inlet thereof, such that the inside of at least one of the fuel electrode, the hydrogen generator and the oxidant electrode is maintained at a positive pressure or atmospheric pressure by injecting the material gas of the material gas feed passage thereinto, and wherein if an abnormality occurs in the purging process with the material gas, the controller is configured to bring the opening/closing state of at least one of the fuel electrode opening/closing device, the hydrogen generator opening/closing device and the oxidant electrode opening/closing device into a state different from the first state according to the contents of the abnormality, such that the inside of at least one of the fuel electrode, the hydrogen generator and the oxidant electrode is maintained at a positive pressure or atmospheric pressure.

The above problems can be also solved by a method for operating a fuel cell system which comprises: a fuel cell for generating electric power, using hydrogen gas at a fuel electrode and oxidizing gas at an oxidant electrode; a hydrogen generator for generating the hydrogen gas from a material gas to feed to the fuel electrode; an oxidizing gas feeder for feeding the oxidizing gas to the oxidant electrode; a material gas feed passage for guiding the material gas into at least the hydrogen generator; a fuel electrode opening/closing device for opening and closing the outlet and inlet of the fuel electrode; an oxidant electrode opening/closing device for opening and closing the outlet and inlet of the oxidant electrode; and a hydrogen generator opening/closing device for opening and closing the outlet and inlet of the hydrogen generator, wherein, during shutdown operation of the fuel cell system, the opening/closing state of at least one of the fuel electrode opening/closing device, the hydrogen generator opening/closing device and the oxidant electrode opening/closing device is brought into a first state where the inside of at least one of the fuel electrode, the hydrogen generator and the oxidant electrode is communicated with the material gas feed passage and the atmosphere through the outlet/inlet thereof so as to allow a through-flow of the material gas, such that the inside of at least one of the fuel electrode, the hydrogen generator and the oxidant electrode is purged with the material gas of the material gas feed passage; and the opening/closing state of at least one of the fuel electrode opening/closing device, the hydrogen generator opening/closing device and the oxidant electrode opening/closing device is brought into a second state where the inside of at least one of the fuel electrode, the hydrogen generator and the oxidant electrode is not communicated with the atmosphere but communicated with the material gas feed passage through the inlet thereof, such that the inside of at least one of the fuel electrode, the hydrogen generator and the oxidant electrode is maintained at a positive pressure or atmospheric pressure by injecting the material gas of the material gas feed passage thereinto, and wherein if an abnormality occurs in the purging process with the material gas, the opening/closing state of at least one of the fuel electrode opening/closing device, the hydrogen generator opening/closing device and the oxidant electrode opening/closing device is brought into a state different from the first state according to the contents of the abnormality, such that the inside of at least one of the fuel electrode, the hydrogen generator and the oxidant electrode is maintained at a positive pressure or atmospheric pressure.

Accordingly, a fuel cell system and an operation method thereof can be obtained which are capable of properly executing special shutdown of the fuel cell system in the event of a failure in the purging process with a material gas.

In the above fuel cell system, if the abnormality in the purging process with the material gas is a failure to measure the amount of the material gas within the material gas feed passage or a failure in posttreatment of gas after the purging process, the controller is configured to bring the opening/closing state of at least one of the fuel electrode opening/closing device, the hydrogen generator opening/closing device and the oxidant electrode opening/closing device into the second state, such that at least one of the fuel electrode, the hydrogen generator and the oxidant electrode is maintained at a positive pressure or atmospheric pressure by injecting the material gas of the material gas feed passage thereinto. In the above fuel cell system operating method, if the abnormality in the purging process with the material gas is a failure to measure the amount of the material gas within the material gas feed passage or a failure in posttreatment of gas after the purging process, the opening/closing state of at least one of the fuel electrode opening/closing device, the hydrogen generator opening/closing device and the oxidant electrode opening/closing device is brought into the second state, such that the inside of at least one of the fuel electrode, the hydrogen generator and the oxidant electrode is maintained at a positive pressure or atmospheric pressure by injecting the material gas of the material gas feed passage thereinto.

According to the above fuel cell system and its operation method, even if a failure occurs in measuring the amount of the material gas by a material gas flow meter or the like, the material gas is properly injected into the fuel electrode, the oxidant electrode and the hydrogen generator to thereby prevent negative pressure generation within these components without fail. This prevents oxidative degradation of the catalysts of the hydrogen generator etc. due to leakage of external air that is caused by internal negative pressure.

In the above fuel cell system, if the abnormality in the purging process with the material gas is a failure to supply the material gas of the material gas feed passage, the controller is configured to bring the opening/closing state of at least one of the fuel electrode opening/closing device, the hydrogen generator opening/closing device and the oxidant electrode opening/closing device into a third state where the inside of at least one of the fuel electrode, the hydrogen generator and the oxidant electrode is not communicated with the material gas feed passage but communicated with the atmosphere through the outlet thereof, such that the inside of at least one of the fuel electrode, the hydrogen generator and the oxidant electrode is opened to the atmosphere. In the above fuel cell system operating method, if the abnormality in the purging process with the material gas is a failure to supply the material gas of the material gas feed passage, the opening/closing state of at least one of the fuel electrode opening/closing device, the hydrogen generator opening/closing device and the oxidant electrode opening/closing device is brought into a third state where the inside of at least one of the fuel electrode, the hydrogen generator and the oxidant electrode is not communicated with the material gas feed passage but communicated with the atmosphere through the outlet thereof, such that the inside of at least one of the fuel electrode, the hydrogen generator and the oxidant electrode is opened to the atmosphere.

According to the above fuel cell system and its operation method, even if a failure occurs in supplying the material gas owing to interruption of the supply pressure of the material gas supply source, the inside of the fuel electrode, the oxidant electrode and the hydrogen generator is opened to the atmosphere to thereby prevent excessive negative pressure generation within these components without fail. This prevents the negative pressure generation within the fuel cell system from exceeding the guaranteed pressure resistance of the fuel cell system. As a result, damage to the gas sealing section of the fuel cell system can be avoided.

As a condition for injecting the material gas into at least one of the fuel electrode, the hydrogen generator and the oxidant electrode, the fuel cell system may be provided with a first temperature detecting device for detecting the temperature of the hydrogen generator. Based on the temperature detected by the first temperature detecting device, the controller is configured to maintain the inside of at least one of the fuel electrode, the hydrogen generator and the oxidant electrode at a positive pressure or atmospheric pressure by injecting the material gas of the material gas feed passage thereinto.

As an alternative condition for injecting the material gas into at least one of the fuel electrode, the hydrogen generator and the oxidant electrode, the fuel cell system may be provided with a second temperature detecting device for detecting the temperature of the fuel cell. Based on the temperature detected by the second temperature detecting device, the controller is configured to maintain the inside of at least one of the fuel electrode, the hydrogen generator and the oxidant electrode at a positive pressure or atmospheric pressure by injecting the material gas of the material gas feed passage thereinto.

By measuring the internal gas temperature of the hydrogen generator and the internal gas temperature of the fuel cell, the controller can make comparisons between these measured temperatures and the dew points of the internal gases and can estimate decreases in the volumes of the gases of the hydrogen generator and the fuel cell. Therefore, the controller can control the fuel cell system so as to maintain the inside of the hydrogen generator and the fuel cell at least a positive pressure or atmospheric pressure, by making use of the internal gas temperatures of the hydrogen generator and the fuel cell properly.

As the third condition for injecting the material gas into at least one of the fuel electrode, the hydrogen generator and the oxidant electrode, the fuel cell system may be provided with a first pressure detecting device for detecting the pressure of the hydrogen generator. Based on the pressure detected by the first pressure detecting device, the controller is configured to maintain the inside of at least one of the fuel electrode, the hydrogen generator and the oxidant electrode at a positive pressure or atmospheric pressure by injecting the material gas of the material gas feed passage thereinto.

Incidentally, the temperature of the hydrogen generator drops more rapidly than the temperature of the fuel cell. Therefore, if the internal pressure of the hydrogen generator is found to be maintained at least a positive pressure or atmospheric pressure by monitoring its measured values, it can be deduced that the internal pressure of the fuel cell is also maintained at least a positive pressure or atmospheric pressure.

The fuel cell system may comprise a first pressure detecting device for detecting the pressure of the hydrogen generator and may be configured such that the controller is configured to open the inside of the hydrogen generator to the atmosphere if the pressure detected by the first pressure detecting device exceeds a specified threshold after the outlet/inlet of the hydrogen generator is sealed off.

With the above structure of the fuel cell system, the internal pressure of the hydrogen generator can be prevented from increasing exceeding the guaranteed pressure resistance of the fuel cell system, even if the condensed water resident in the low temperature region flows into the high temperature region (i.e., the hydrogen generator) and evaporation of the condensed water causes excessive positive pressure generation within the hydrogen generator during shutdown of the fuel cell system. As a result, damage to the gas sealing section of the fuel cell system can be avoided.

The fuel cell system may further comprise a heating combustor for heating the hydrogen generator through heat exchange with combustion gas and an air feeding device for supplying the heating combustor with air to be used for generating the combustion gas. This fuel cell system may be configured such that, during shutdown operation of the fuel cell system, the controller is configured to maintain the inside of at least one of the fuel electrode, the hydrogen generator and the oxidant electrode at a positive pressure or atmospheric pressure, by injecting the material gas of the material gas feed passage thereinto, while controlling the air feeding device after stopping combustion gas generation in the heating combustor such that the hydrogen generator is cooled down through heat exchange with air.

In the fuel cell system of such a structure, the hydrogen generator is quickly cooled down through heat exchange with air sent from the air feeding device.

The fuel cell system may comprise a second pressure detecting device for detecting supply pressure for the material gas of the material gas feed passage and may be configured such that if the pressure detected by the second pressure detecting device is equal to or higher than a specified threshold, the controller is configured to maintain the inside of at least one of the fuel electrode, the hydrogen generator and the oxidant electrode at a positive pressure or atmospheric pressure by injecting the material gas of the material gas feed passage thereinto.

The fuel cell system may comprise a second pressure detecting device for detecting the supply pressure of the material gas of the material gas feed passage and may be configured such that if the pressure detected by the second pressure detecting device is lower than a specified threshold, the controller is configured to open the inside of at least one of the fuel electrode, the hydrogen generator and the oxidant electrode to the atmosphere.

In this way, the controller determines whether or not the material gas supply pressure in the material gas feed passage steps over a specified threshold (e.g., the lower limit of the internal pressure of the hydrogen generator). Only if the material gas supply pressure is not lower than the threshold, the material gas will be injected into the fuel electrode, the hydrogen generator and/or the oxidant electrode such that the inside of the fuel cell system is controlled and maintained at a positive pressure or atmospheric pressure. If the material gas supply pressure is lower than the threshold, the inside of the fuel cell system is controlled so as to be opened to the atmosphere without injecting the material gas into the fuel electrode, the hydrogen generator and/or the oxidant electrode. Thus, the special shutdown of the fuel cell system is properly executed in accordance with the value of the material gas supply pressure.

The fuel cell system may be configured such that, during a stand-by period of the fuel cell system after shutdown operation, the controller is configured to maintain the inside of at least one of the fuel electrode, the hydrogen generator and the oxidant electrode at a positive pressure or atmospheric pressure by injecting the material gas of the material gas feed passage thereinto.

In this arrangement, during a stand-by period of the fuel cell system after shutdown operation, the controller determines whether or not a specified condition is met in the fuel cell system (e.g., whether the internal pressure of the hydrogen generator has dropped to its lower limit). If the specified condition is met, the material gas of the material gas feed passage is injected into the fuel electrode, the hydrogen generator and/or the oxidant electrode in order to prevent negative pressure generation within the fuel electrode, the hydrogen generator and/or the oxidant electrode. Accordingly, pressurizing operation is properly executed to maintain the inside of the fuel electrode, the hydrogen generator and/or the oxidant electrode at least a positive pressure.

The fuel cell system may be configured such that, during a stand-by period of the fuel cell system after shutdown operation, the controller is configured to open the inside of at least one of the fuel electrode, the hydrogen generator and the oxidant electrode to the atmosphere.

In this arrangement, during a stand-by period of the fuel cell system after shutdown operation, the controller determines whether or not a specified condition is met in the fuel cell system (e.g., whether the internal pressure of the hydrogen generator has reached a specified negative pressure level). If the specified condition is met, the inside of the fuel electrode, the hydrogen generator and/or the oxidant electrode is temporarily opened to the atmosphere, thereby suppressing the negative pressure condition of the inside of the fuel electrode, the hydrogen generator and/or the oxidant electrode.

These objects as well as other objects, features and advantages of the invention will become apparent to those skilled in the art from the following detailed description of a preferred embodiment with reference to the accompanying drawings.

Effects of the Invention

According to the invention, it is possible to obtain a fuel cell system and an operation method thereof, which are capable of properly executing special shutdown of the fuel cell system in the event of a trouble in purge operation by use of a material gas.

EXPLANATION OF REFERENCE NUMERALS

Figure 1:
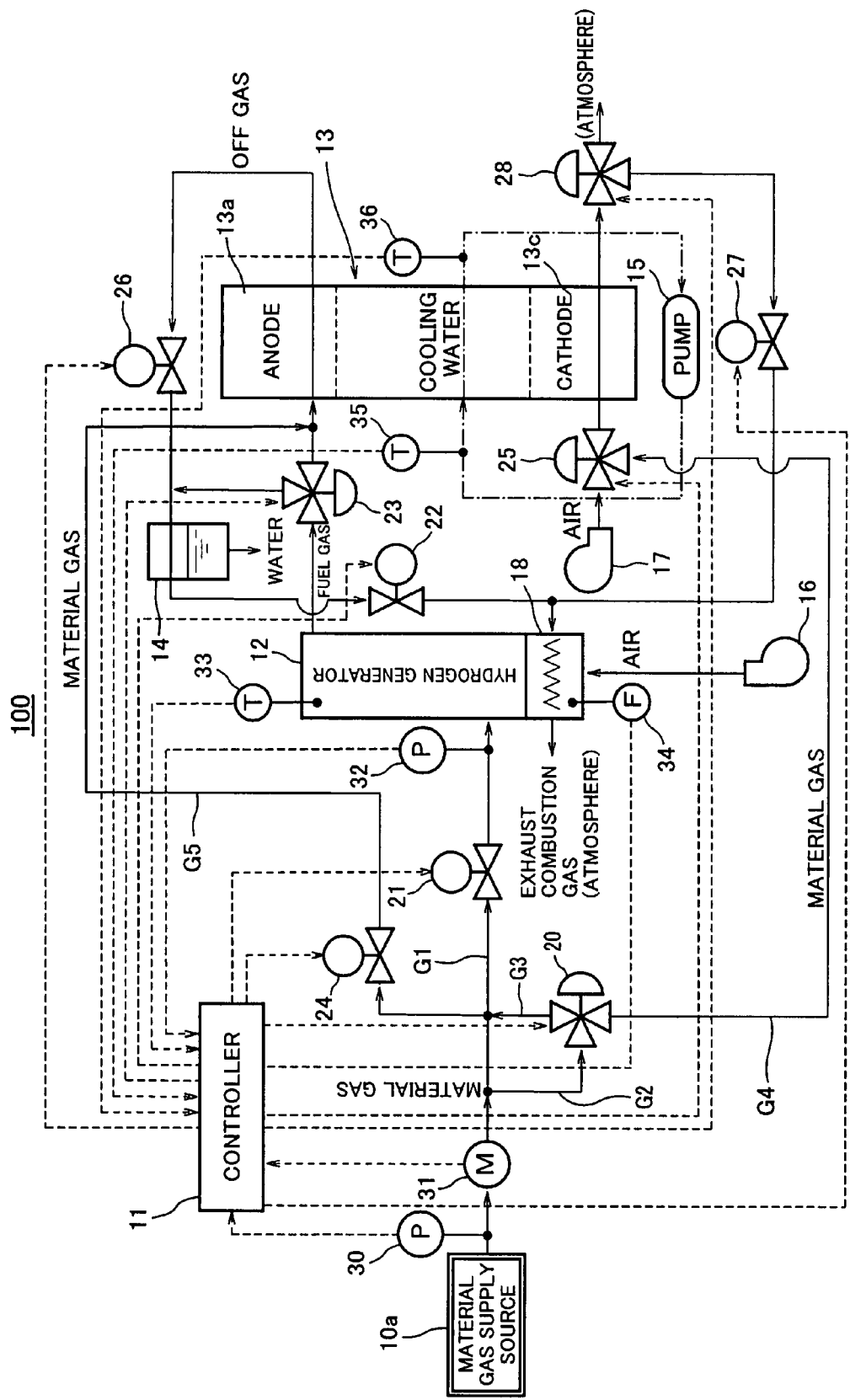
FIG. 1 is a block diagram that schematically illustrates the structure of a fuel cell system according to an embodiment of the invention.

10a: material gas supply source
11: controller
12: hydrogen generator
13: fuel cell
13a: anode
13c: cathode
14: water removing device
15: cooling water pump
16: first blower
17: second blower
18: heating combustor
20: first three-way valve
21: fifth two-way valve
22: third two-way valve
23: second three-way valve
24: first two-way valve
25: third three-way valve
26: second two-way valve
27: fourth two-way valve
28: fourth three-way valve
30: first pressure detecting device
31: material gas flow meter
32: second pressure detecting device
33: first temperature detecting device
34: combustion detecting device
35: second temperature detecting device
36: third temperature detecting device
100: fuel cell system
G1: material feed pipeline
G2: first material branch pipeline
G3: material return pipeline
G4: second material branch pipeline
G5: third material branch pipeline

BEST MODE FOR CARRYING OUT THE INVENTION

Referring now to the accompanying drawings, a preferred embodiment of the invention will be described below.

FIG. 1 is a block diagram that schematically illustrates the structure of a fuel cell system according to an embodiment of the invention.

As illustrated in FIG. 1, the fuel cell system 100 includes a solid polymer electrolyte fuel cell 13 having an anode 13a (fuel electrode) and a cathode 13c (oxidant electrode); a hydrogen generator 12 that generates hydrogen-rich fuel gas (reformed gas) by reforming city gas or natural gas (i.e., material gas for power generation) with water to feed to the anode 13a of the fuel cell 13; a water feeding device (not shown) for feeding properly reformed water to the hydrogen generator 12; a water removing device 14 for removing water from residual fuel gas (off gas) discharged without being consumed at the anode 13a of the fuel cell 13; a heating combustor 18 for heating the hydrogen generator 12 by combusting the off gas that has been dried by removing water therefrom; a first blower 16 that serves as an air feeding device for supplying the heating combustor 18 with air to be used for combustion; a second blower 17 that serves as an oxidizing gas feeding device for supplying oxidizing gas (air) to the cathode 13c of the fuel cell 13 and discharging it from the fuel cell 13; and a cooling water pump 15 for guiding cooling water into the fuel cell 13 so as to properly keep the internal temperature of the fuel cell 13. A material feed pipeline G1 is provided which serves as a material gas feed passage constructed so as to guide material gas into the hydrogen generator 12. Flowing within the material feed pipeline G1 are the material gas that serves as a material for power generation to be fed to the hydrogen generator 12 and the material gas that serves as a purge gas to be supplied to the hydrogen generator 12, the anode 13a and the cathode 13c (this will be described later).

In the fuel cell system 100, the fuel gas fed from the hydrogen generator 12 to the anode 13a of the fuel cell 13 and air fed from the second blower 17 to the cathode 13c of the fuel cell 13 are allowed to react with each other, thereby generating electric power within the fuel cell 13.

The fuel gas generation within the hydrogen generator 12 and the power generation within the fuel cell 13 are carried out with known techniques and therefore a detailed description of the internal structures of these components, the fuel gas generating operation and the power generating operation is omitted herein.

Connected as illustrated in FIG. 1 on the upstream side of a fifth two-way valve 21 (described later) within the material feed pipeline G1 are a material gas supply source 10a that serves as a feed valve for supplying a material gas such as city gas 13A; a first pressure detecting device 30 for measuring supply pressure for the material gas; a material gas flow meter 31 located downstream of the first pressure detecting device 30, for measuring the feed rate of the material gas; one end of a first two-way valve 24 (on-off valve) that functions as a purge gas feeding device for supplying the fuel cell 13 and the hydrogen generator 12 with the material gas for purging; and two ends of a first three-way valve 20 (selector valve). The structure for the connection between the material feed pipeline G1 and the valves 20, 21, 22 will be described later in detail.

The material gas feed mater 31 is, for example, an orifice flow meter (differential pressure type flow meter) that measures the flow rate of gas by converting data on gas temperature and gas differential pressure.

The fuel gas feeding system and off-gas reflux flow system of the hydrogen generator 12 have a second three-way valve 23 (selector valve) provided in a pipeline (fuel gas pipeline) that connects the outlet of the hydrogen generator 12 to the inlet of the anode 13a; a second two-way valve 26 (on-off valve) provided in a pipeline (off gas pipeline) that connects the outlet of the anode 13a to the inlet of the water removing device 14; and the third two-way valve 22 (on-off valve) provided in a pipeline that connects the outlet of the water removing device 14 to the offgas inlet of the heating combustor 18.

The second three-way valve 23 is also connected to a branch pipeline that connects the fuel gas pipeline to the offgas pipeline, so that the fuel gas flowing out from the hydrogen generator 12 is directly sent to the middle of the pipeline between the second two-way valve 26 and the water removing device 14 without being guided to the anode 13a.

The first two-way valve 24 connected to the material feed pipeline G1 is connected to the pipeline between the second three-way valve 23 of the fuel gas feeding system and the inlet of the anode 13a through a third material branch pipeline G5 (described later), so that the material gas is supplied from the material feed pipeline G1 to the anode 13a through the third material branch pipeline G5.

In such a fuel gas feeding system and off-gas reflux flow system, when communication is established between the outlet of the hydrogen generator 12 and the inlet of the anode 13a by switching the second three-way valve 23, the fuel gas flowing out from the hydrogen generator 12 is guided into the anode 13a and used as a fuel for power generation within the anode 13a. Thereafter, the fuel gas is discharged outward as off-gas through the outlet of the anode 13a. This off-gas passes through the second two-way valve 26 in an open state and is then dried by removing moisture (such as vapor and minute water droplets) from it with the water removing device 14. The dried off-gas goes to the heating combustor 18, passing through the third two-way valve 22 in an open state and is then combusted within the heating combustor 18.

The heat generated from the combustion of the off-gas may be utilized for heating the hydrogen generator 12.

In cases where the outlet of the hydrogen generator is communicated with the off-gas pipeline (the part of the pipeline between the second two-way valve 26 and the inlet of the water removing device 14) by switching the second three-way valve 23, the inflammable gas (the fuel gas and material gas) flowing out from the hydrogen generator 12 directly goes to the water removing device 14 without passing through the anode 13a. After moisture is removed from the inflammable gas within the water removing device 14, the inflammable gas is sent to and combusted by the heating combustor 18.

An oxidizing gas feeding system communicated with the second blower 17 includes a third three-way valve 25 (selector valve) provided in a pipeline that connects the second blower 17 to the inlet of the cathode 13c; a fourth three-way valve 28 (selector valve) provided in a pipeline that connects the outlet of the cathode 13c to the atmosphere; and a fourth two-way valve 27 (on-off valve) provided in a pipeline that connects the fourth three-way valve 28 to the heating combustor 18.

The first three-way valve 20 connected to the material feed pipeline G1 and the third three-way valve 25 in the oxidizing gas feeding system are connected to each other through a second material branch pipeline G4 (described later), so that the material gas is fed from the material feed pipeline G1 to the cathode 13c.

In such an oxidizing gas feeding system, when establishing communication between the second blower 17 and the inlet of the cathode 13c by switching the third three-way valve 25 and communication between the outlet of the cathode 13c and the atmosphere by switching the fourth three-way valve 28, the oxidizing gas (air) flowing out from the second blower 17 is heated and humidified by a proper heating/humidifying device (not shown). Thereafter, the oxidizing gas is guided into the cathode 13c to be used as an oxidant for power generation within the cathode 13c and then discharged to the atmosphere.

When establishing communication between the first three-way valve 20 and the inlet of the cathode 13c by switching the third three-way valve 25 and communication between the outlet of the cathode 13c and the fourth two-way valve 27 by switching the fourth three-way valve 28, the material gas flowing in the material feed pipeline G1 is guided into the cathode 13c through the second material branch pipeline G4. After the inside of the cathode 13c undergoes a process (described later), the material gas goes to the heating combustor 18, passing through the fourth two-way valve 27 in an open state and is then combusted within the heating combustor 18.

In a material gas feeding system, while the material gas sent from the material gas supply source 10a such as a city gas supply source is measured by the first pressure detecting device 30 and the material gas flow meter 31 in terms of gas supply pressure and gas feed rate, sulfur is removed from the material gas by means of an appropriate desulfurizer (not shown).

The feeding system for the material gas after desulfurization has a first material feeding route for sending the material gas to the hydrogen generator 12; a second material gas feeding route for sending the material gas to the cathode 13c; and a third material gas feeding route for sending the material gas to the anode 13a.

The first material gas feeding route has the fifth two-way valve 21 (on-off valve) provided in the pipeline (the material feed pipeline G1) that connects the downstream side of the material gas supply source 10a to the inlet of the hydrogen generator 12. The material gas flowing in the material feed pipeline G1 is guided into the hydrogen generator 12 through the fifth two-way valve 21 in an open state.

Thanks to the first material gas feeding route described above, during power generating operation of the fuel cell system 100, the hydrogen generator 12 generates hydrogen-rich fuel gas from the material gas sent from the material feed pipeline G1, through a vapor reforming reaction by use of, for example, a reforming catalyst. During shutdown of the fuel cell system 100, the material gas sent from the material feed pipeline G1 is guided into the hydrogen generator 12 and an adequate process (details of which will be described later) such as gas purging or pressurization is performed on the inside of the hydrogen generator 12, using the material gas.

By switching the second three-way valve 23, the gas, which includes the material gas discharged outward after performing the adequate process on the hydrogen generator 12, is sent to the heating combustor 18 by way of the water removing device 14 and the third two-way valve 22 in an open state, without passing through the anode 13. Then, the gas is combusted and subjected to proper posttreatment within the heating combustor 18.

In the second material gas feeding route, a first material branch pipeline G2 diverging from the material feed pipeline G1 located downstream of the material gas flow meter 31 is connected to the first three-way valve 20, whereas the first three-way valve 20 is connected, through a material return pipeline G3, to the material feed pipeline G1 located downstream of the diverging point of the first material branch pipeline G2 and upstream of the fifth two-way valve 21. Further, the second material branch pipeline G4 extending from the first three-way valve 20 is connected to the third three-way valve 25 of the oxidizing gas feeding system as described earlier.

Thanks to the second material gas feeding route, during shutdown of the fuel cell system 100, the material gas, which flows from the first three-way valve 20 connected to the material feed pipeline G1 into the second material branch pipeline G4, is guided into the cathode 13c by way of the third three-way valve 25. By use of this material gas, an adequate process (the details of which will be described later) such as gas purging or pressurization is performed on the inside of the cathode 13c.

The gas, which includes the material gas discharged outward after performing the adequate process on the inside of the cathode 13c, is sent to the heating combustor 18 by way of the fourth two-way valve 27 in an open state, and then, combusted and subjected to proper posttreatment within the heating combustor 18.

The third material gas feeding route is located downstream of the diverging point of the first material branch pipeline G2 and has the first two-way valve 24 provided in the third material branch pipeline G5 that connects the mid point of the material feed pipeline G1 located upstream of the fifth two-way valve 21 to the pipeline extending between the second three-way valve 23 and the inlet of the anode 13a in the fuel gas feeding system.

Thanks to the third material feeding route, during shutdown of the fuel cell system 100, the material gas, which flows from the first two-way valve 24 connected to the material feed pipeline G1 into the third material branch pipeline G3, is guided into the anode 13a. By use of this material gas, pressurization (the details of which are described later) is performed on the inside of the anode 13a.

The controller 11 is an arithmetic operation unit such as a microprocessor that controls the components of the fuel cell systems 100, thereby properly controlling the start-up, power generation and shutdown operations of the fuel cell system 100.

Examples of the objects controlled by the controller 11 include: hydrogen generator opening/closing devices comprising electromagnetic on-off valves and electromagnetic selector valves (the third and fifth two-way valves 22, 21 and the second three-way valve 23) for opening and closing the outlet and inlet of the hydrogen generator; fuel electrode opening/closing devices comprising electromagnetic on-off valves and electromagnetic selector valves (the first, second, third two-way valves 24, 26, 22 and the second three-way valve 23) for opening and closing the outlet and inlet of the anode 13a; and oxidant electrode opening/closing devices comprising electromagnetic on-off valves and electromagnetic selector valves (the fourth two-way valve 27 and the first, third and fourth three-way valves 20, 25, 28) for opening and closing the outlet and inlet of the cathode 13c.

Examples of the input sensor of the controller 11 include, in addition to the material gas flow meter 31 and the first pressure detecting device 30 which have been described already, the second pressure detecting device 32 for measuring the internal pressure of the hydrogen generator 12; a first temperature detecting device 33 (e.g., a thermocouple) for measuring the temperature of the gas in the hydrogen generator 12; a combustion detecting device 34 (e.g., a flame rod) for detecting the combusting condition of the heating combustor 18; a second temperature detecting device 35 (e.g., a thermocouple) that is placed in the vicinity of the cooling water inlet of a cooling water pipeline for cooling the fuel cell 13 and capable of predicting the temperature of the gas flowing in the anode 13a and the cathode 13c by measuring the temperature of cooling water that flows in the vicinity of the cooling water inlet of the fuel cell 13; and a third temperature detecting device 36 (e.g., a thermocouple) that is placed in the vicinity of the cooling water outlet of the cooling water pipeline for cooling the fuel cell 13 and capable of predicting the temperature of the gas flowing in the anode 13a and the cathode 13c by measuring the temperature of cooling water that flows in the vicinity of the cooling water outlet of the fuel cell 13.

The controller 11 houses an error detecting device (not shown) for the material gas flow meter 31, so that an error signal is output in the event of a failure (such as data errors associated with gas temperature and gas differential pressure owing to the short-circuit or breaking of the wiring of the material gas flow meter 31) in the material gas flow meter 31.

In the operation of the fuel cell system the details of which will be described later, the controller 11 properly controls the opening/closing operation of the aforesaid valves 20, 21, 22, 23, 24, 25, 26, 27 based on detection data obtained from the aforesaid input sensors 30, 31, 32, 33, 34, 35, 36.

In the present specification, the term "controller" means not only a single control unit but also a group of control units that control the operation of the fuel cell system 100 in cooperation with one another. Therefore, the controller 11 is not necessarily comprising a single control unit but may be a plurality of control units dispersedly placed which control the operation of the fuel cell system 100 in cooperation.

It should be noted that the valve arrangement shown in FIG. 1 is only one example and may be properly modified according to the configurations of the hydrogen generator and the fuel cell.

Next, examples of the shutdown operation of the fuel cell system 100 according to the embodiment will be described with reference to the accompanying drawings.

First, the shutdown operation of the fuel cell system 100 in a normal shutdown mode will be described and then, the shutdown operation of the fuel cell system 100 in a special shutdown mode will be described.

[Shutdown Operation of the Fuel Cell System (Normal Shutdown)]

Figure 2:
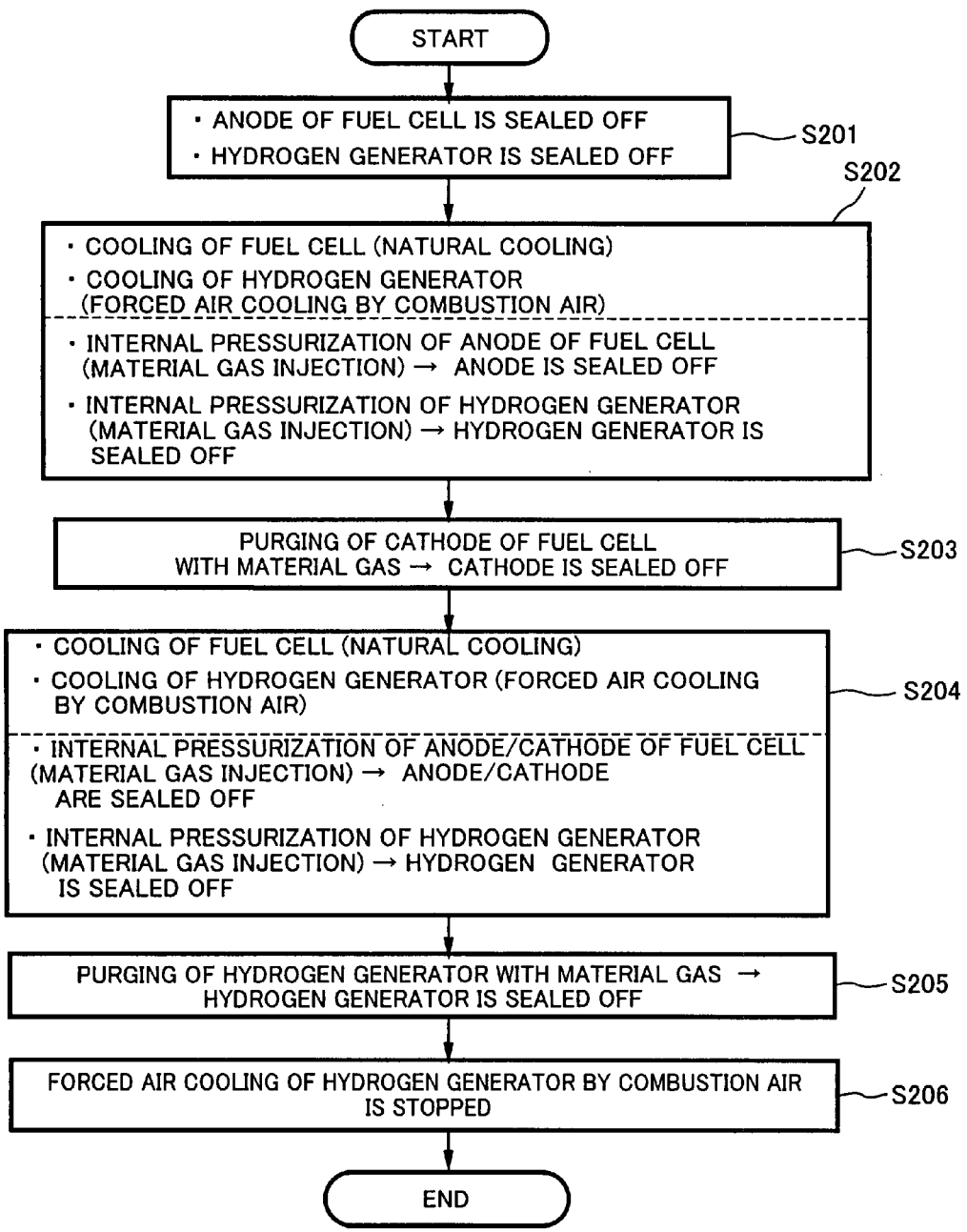
FIG. 2 is a flow chart that shows an example of the normal shutdown operation performed in the fuel cell system according to the embodiment.

FIG. 2 is a flow chart that shows an example of the normal shutdown operation performed in the fuel cell system according to the embodiment.

If the controller 11 receives a normal pressure signal from the first pressure detecting device 30 used for measuring the supply pressure of the material gas supply source and receives no error detection signals from the error detecting device for detecting errors in the material gas flow meter 31, the controller 11 controls the valves associated with Steps S201 to S206 shown in FIG. 2 to thereby execute normal shutdown of the fuel cell system 100.

After the fuel cell system 100 enters a shutdown process such as a stop of the power generating operation of the fuel cell 13 or a stop of the combusting operation of the heating combustor 18, the outlet and inlet of the anode 13*a* and the outlet and inlet of the hydrogen generator 12 are sealed off (Step S201).

More specifically, the second, third and fifth two-way valves 26, 22, 21 are sealed off whereas the second three-way valve 23 is switched so as to communicate the outlet of the hydrogen generator 12 with the pipeline between the second two-way valve 26 and the inlet of the water removing device 14 (while communication between the outlet of the hydrogen generator 12 and the inlet of the anode 13*a* is shut off). Thereby, the outlet and inlet of the anode 13*a* and the outlet and inlet of the hydrogen generator 12 are properly sealed off (the valve operation (described later) for sealing the outlet and inlet of the anode 13*a* and the outlet and inlet of the hydrogen generator 12 is performed in the same way).

Next, the fuel cell 13 is allowed to cool (natural cooling), while the heating combustor 18 being supplied with air from the first blower 16 for combustion air supply. The hydrogen generator 12 exchanges heat with this air so that the hydrogen generator 12 is forcibly cooled.

In addition, negative pressure generation within the anode 13*a* and the hydrogen generator 12 caused by the dew condensation of vapor existing in the anode 13*a* and the hydrogen generator 12 is prevented upon meeting a predetermined condition for the fuel cell system 100 (e.g., upon elapse of a specified period of time after shutdown of the fuel cell system 100 or upon a drop in the internal pressure of the hydrogen generator 12). To this end, the material gas of the material feed pipeline G1 is injected into the anode 13*a* and the hydrogen generator 12 under the supply pressure of the material gas supply source and pressurizing operation is executed so as to maintain the inside of the anode 13*a* and the hydrogen generator 12 at least a positive pressure or atmospheric pressure. Subsequently to such internal pressurizing operation, the anode 13*a* and the hydrogen generator 12 are again sealed off (Step S202).

More specifically, in the condition where the outlet and inlet of the anode 13*a* and the outlet and inlet of the hydrogen generator 12 are sealed off, the first three-way valve 20 is switched so as to establish communication between the first material branch pipeline G2 and the material return pipeline G3 (while shutting off communication between the first material branch pipeline G2 and the second material branch pipeline G4), and then, the first and fifth two-way valves 24, 21 are temporarily opened. During the period when the first two-way valve 24 is opened, the anode 13*a* is communicated with the material feed pipeline G1 through the inlet of the anode 13*a* so that the anode 13*a* is not communicated with the atmosphere (the second state). As a result, a proper amount of the material gas is injected from the material feed pipeline G1 into the anode 13*a* under the supply pressure of the material gas supply source. During the period when the fifth two-way valve 21 is opened, the hydrogen generator 12 is communicated with the material feed pipeline G1 through the inlet of the hydrogen generator 12 so that the hydrogen generator 12 is not communicated with the atmosphere (the second state). As a result, a proper amount of the material gas is injected from the material feed pipeline G1 into the hydrogen generator 12 under the supply pressure of the material gas supply source. Thereby, negative pressure generation within the anode 13*a* and the hydrogen generator 12 is prevented.

After the temperature of the fuel cell system 100 drops to a specified reference temperature, the cathode 13*c* is purged with the material gas sent from the material feed pipeline G1 under the supply pressure of the material gas supply source. Thus, purging operation is performed on the cathode 13*c*. Upon completion of the purging operation performed on the cathode 13*c* with the material gas, the outlet and inlet of the cathode 13*c* are sealed off (Step S203).

More specifically, the first three-way valve 20 is switched so as to establish communication between the first material branch pipeline G2 and the second material branch pipeline G4 (while shutting off communication between the first material branch pipeline G2 and the material return pipeline G3); the third three-way valve 25 is switched so as to establish communication between the second material branch pipeline G4 and the inlet of the cathode 13*c* (while shutting off communication between the second blower 17 and the inlet of the cathode 13*c*); and the fourth three-way valve 28 is switched so as to establish communication between the outlet of the cathode 13*c* and the fourth two-way valve 27 (while shutting off communication between the outlet of the cathode 13*c* and the atmosphere). Then, the fourth two-way valve 27 is opened in this condition so that the cathode 13*c* is communicated with the material feed pipeline G1 and the atmosphere, allowing the material gas to pass therethrough by way of the outlet and inlet of the cathode 13*c* (the first state). As a result, the material gas coming from the material gas supply source 10*a* is guided to the cathode 13*c* by way of the first material branch pipeline G2 and the second material branch pipeline G4, thereby replacing the gas resident in the cathode 13*c* with the material gas. Then, the purged gas including the material gas discharged from the cathode 13*c* by pressure feeding of the material gas to the cathode 13*c* passes through the fourth two-way valve 27 in its open state. After moisture is removed from the purged gas by an adequate water removing device (not shown), the purged gas is sent to the heating combustor 18 and combusted and subjected to post treatment thereat.

During combustion of the purged gas by the heating combustor 18, forced air cooling of the hydrogen generator 12 by air from the first blower 16 once stops.

Thereafter, the first three-way valve 20 is switched so as to establish communication between the first material branch pipeline G2 and the material return pipeline G3 (while shutting off communication between the first material branch pipeline G2 and the second material branch pipeline G4); the third three-way valve 25 is switched so as to establish communication between the second material branch pipeline G4 and the inlet of the cathode 13*c* (while shutting off communication between the second blower 17 and the inlet of the cathode 13*c*); the fourth three-way valve 28 is switched so as to establish communication between the outlet of the cathode 13*c* and the fourth two-way valve 27 (while shutting off communication between the outlet of the cathode 13*c* and the atmosphere); and the fourth two-way valve 27 is closed. Thereby, the outlet and inlet of the cathode 13*c* are properly sealed off (the valve operation (described later) for sealing the outlet and inlet of the cathode 13c is performed in the same way).

Subsequently, the fuel cell 13 is subjected to natural cooling similarly to the process of Step S202, while air is fed from the first blower for combustion air supply 16 to the heating combustor 18. Forced air cooling of the hydrogen generator 12 is done through heat exchange with this air.

In addition, negative pressure generation within the anode 13a, the cathode 13c and the hydrogen generator 12 owing to the dew condensation of vapor existing in the anode 13a, the cathode 13c and the hydrogen generator 12 is prevented upon meeting a predetermined condition for the fuel cell system 100 (e.g., upon elapse of a specified period of time after shutdown of the fuel cell system 100 or upon a drop in the internal pressure of the hydrogen generator 12). To this end, the material gas of the material feed pipeline G1 is injected into the anode 13a, the cathode 13c and the hydrogen generator 12 under the supply pressure of the material gas supply source and pressurizing operation is executed so as to maintain the inside of the anode 13a, the cathode 13c and the hydrogen generator 12 at least a positive pressure or atmospheric pressure. Subsequently to such internal pressurizing operation, the anode 13a, the cathode 13c and the hydrogen generator 12 are again sealed off (Step S204).

More specifically, in the condition where the cathode 13c is sealed off, the first three-way valve 20 is temporarily switched so as to establish communication between the first material branch pipeline G2 and the second material branch pipeline G4 (while temporarily shutting off communication between the first material branch pipeline G2 and the material return pipeline G3).

During the temporary switching of the first three-way valve 20, the cathode 13c is communicated with the material feed pipeline G1 through the inlet of the cathode 13c so that the cathode 13c is not communicated with the atmosphere (the second state). As a result, a proper amount of the material gas is injected from the material feed pipeline G1 into the cathode 13c under the supply pressure of the material gas supply source, so that negative pressure generation within the cathode 13c is prevented. It should be noted that the operation of a material gas injector valve for injecting the material gas into the anode 13a and the hydrogen generator 12 is the same as the operation in Step S202 and therefore an explanation thereof is omitted herein.

After the temperature of the fuel cell system 100 (i.e., the temperature of the hydrogen generator 12) drops to a specified reference temperature, the hydrogen generator 12 is purged by the material gas sent from the material feed pipeline G1 under the supply pressure of the material gas supply source. Thus, purging operation is performed on the hydrogen generator 12. Upon completion of the purging operation performed on the hydrogen generator 12 by the material gas, the outlet and inlet of the hydrogen generator 12 are again sealed off (Step S205).

More specifically, the first three-way valve 20 is switched so as to establish communication between the first material branch pipeline G2 and the material return pipeline G3 (while shutting off communication between the first material branch pipeline G2 and the second material branch pipeline G4); and the second three-way valve 23 is switched so as to establish communication between the outlet of the hydrogen generator 12 and the pipeline between the second two-way valve 26 and the inlet of the water removing device 14 (while shutting off communication between the outlet of the hydrogen generator 12 and the inlet of the anode 13a). Then, the fifth and third two-way valves 21, 22 are opened in this condition so that the hydrogen generator 12 is communicated with the material feed pipeline G1 and the atmosphere, allowing the material gas to pass therethrough by way of the outlet and inlet of the hydrogen generator 12 (the first state). As a result, the material gas coming from the material gas supply source 10a is guided into the hydrogen generator 12 by way of the material feed pipeline G1, thereby replacing the gas resident in the hydrogen generator 12 with the material gas. Then, the water removing device 14 removes moisture from the purged gas that includes the material gas discharged from the hydrogen generator 12 by pressure feeding of the material gas to the hydrogen generator 12. Thereafter, the purged gas is sent to the heating combustor 18 through the third two-way valve 22 in an open state and combusted and subjected to post treatment thereat.

During combustion of the purged gas by the heating combustor 18, the forced air cooling of the hydrogen generator 12 with air sent from the first blower 16 is stopped.

Upon dropping of the temperature of the fuel cell system 100 (i.e., the temperature of the hydrogen generator 12) to a sufficient degree, the forced air cooling of the hydrogen generator 12 by heat exchange with air sent from the first blower 16 stops (Step S206), so that the normal shutdown operation of the fuel cell system 100 is completed.

According to such a shutdown operation of the fuel cell system, when shutting down the fuel cell system 100, purging of the fuel cell system 100 with the material gas is properly done instead of the conventional nitrogen gas purging, so that the need for a nitrogen system can be eliminated and, in consequence, the cost and size of the fuel cell system 100 can be reduced.

The material gas is properly injected into the anode 13a, the cathode 13c and the hydrogen generator 12, thereby preventing negative pressure generation within these components. This prevents oxidative degradation of the catalysts in these components which degradation is caused by external air flowing into the hydrogen generator 12 and others owing to the negative internal pressure. Generally, if the internal pressure of the fuel cell system 100 becomes negative to a significant degree stepping over the guaranteed pressure resistance (As the guaranteed pressure difference, 20 kPa, for instance, can be conceived which is equivalent to a pressure difference relative to atmospheric pressure) of the fuel cell system 100, the components of the fuel cell system 100 will get damaged. With the operation described above, such an unfavorable situation can be avoided.

[Modification of the Shutdown Operation (Normal Shutdown) of the Fuel Cell System Shown in FIG. 2]

Although the embodiment has been described with a case where the anode 13a of the fuel cell 13 is filled with hydrogen-rich fuel gas during the shutdown operation of the fuel cell system 100, the anode 13a may be purged with the material gas. In this case, either of two passages may be employed: One is a first passage for guiding the material gas, which has passed through the third material branch pipeline G5, into the anode 13a. The other one is a second passage for guiding the material gas, which has passed through the hydrogen generator 12, without passing through the third material branch pipeline G5, into the anode 13a.

Where the first passage is employed, the fuel electrode opening/closing devices for opening and closing the outlet/inlet of the anode 13a comprise the first, second and third two-way valves 24, 26, 22 and the second three-way valve 23 similarly to the above embodiment. In one example of the operation of the fuel electrode opening/closing devices, the second three-way valve 23 is switched so as to establish communication between the outlet of the hydrogen generator 12 and the pipeline between the second two-way valve 26 and the inlet of the water removing device 14. In this condition, the first, second and third two-way valves 24, 26, 22 are opened whereby the anode 13a is communicated with the material feed pipeline G1 and the atmosphere, thereby allowing the material gas to pass therethrough by way of the outlet and inlet of the anode 13a (the first state). As a result, the material gas coming out from the material gas supply source 10a is guided into the anode 13a by way of the third material branch pipeline G5, so that the gas resident in the anode 13a is replaced with the material gas.

Where the second passage is employed, the fuel electrode opening/closing devices for opening and closing the outlet/inlet of the anode 13a comprise the second and third two-way valves 26, 22 and the second three-way valve 23. In one example of the operation of the fuel electrode opening/closing devices, the second three-way valve 23 is switched so as to establish communication between the outlet of the hydrogen generator 12 and the inlet of the anode 13a. In this condition, the second and third two-way valves 26, 22 are opened (while the fifth two-way valve 21 on the inlet side of the hydrogen generator 12 being opened), whereby the anode 13a is communicated with the material feed pipeline G1 (through the hydrogen generator 12) and the atmosphere, thereby allowing the material gas to pass therethrough by way of the outlet and inlet of the anode 13a (the first state). As a result, the material gas coming out from the material gas supply source 10a is guided into the anode 13a by way of the material feed pipeline G1 and the hydrogen generator 12 (while purging the hydrogen generator 12 with the material gas), so that the gas resident in the anode 13a is replaced with the material gas.

It is also possible to guide the material gas into the hydrogen generator 12 and the anode 13a of the fuel cell 13 at a time, using the second passage described above. The valve operation for injecting the material gas into the hydrogen generator 12 and the anode 13a of the fuel cell 13 at a time can be easily understood from the foregoing description and FIG. 2, and therefore an explanation thereof is omitted herein.

[Shutdown Operation of the Fuel Cell System (Special Shutdown in the Event of Failure of the Material Gas Flow Meter)]

Figure 3:
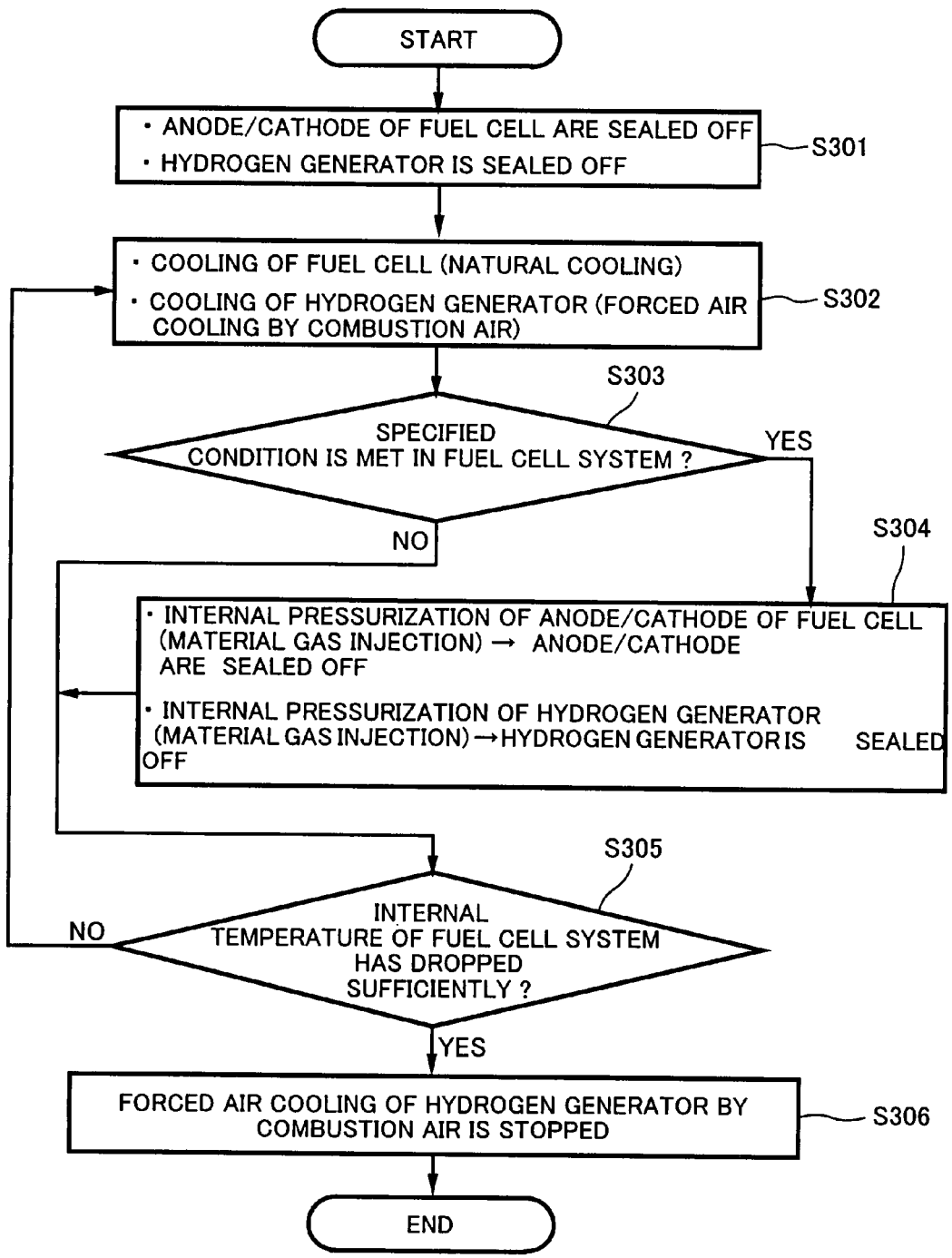
FIG. 3 is a flow chart that shows an example of the special shutdown operation performed in the event of failure of a material gas flow meter in the fuel cell system according to the embodiment.

FIG. 3 is a flow chart that shows an example of the special shutdown operation performed in the event of failure of a material gas flow meter in the fuel cell system according to the embodiment.

If the controller 11 receives an error detection signal indicative of occurrence of an error in the material gas flow meter 31 for measuring the feed rate of the material gas, the valves associated with Steps S301 to 306 shown in FIG. 3 are controlled to execute special shutdown to cope with the failure of the material gas flow meter 31 of the fuel cell system 100 (failure to measure the material gas).

As seen from the flow chart of FIG. 3, during special shutdown of the fuel cell system 100 in the event of failure of the material gas flow meter 31, the feed rate of the material gas cannot be measured by the material gas flow meter 31 and therefore the material gas purge process in which the cathode 13c and the hydrogen generator 12 are purged with the material gas is skipped.

The internal pressurizing operation (material gas injection) performed on the anode 13a, cathode 13c and hydrogen generator 12 does not differ from the operation described earlier and therefore a detailed description of the valve operation associated therewith is omitted herein. Also, the sealing operation for the outlets and inlets of the anode 13a, cathode 13c and hydrogen generator 12 is the same as the operation described earlier and therefore a detailed description of the valve operation associated therewith is omitted herein.

After the fuel cell system 100 enters the shutdown process such as a stop of the power generating operation of the fuel cell 13 or a stop of the combusting operation of the heating combustor 18, the outputs/inlets of the anode 13a and cathode 13c of the fuel cell 13 and the output/inlet of the hydrogen generator 12 are sealed off (Step S301).

Next, the fuel cell 13 is allowed to cool (natural cooling), while the heating combustor 18 being supplied with air from the first blower 16 for combustion air supply. The hydrogen generator 12 exchanges heat with this air so that the hydrogen generator 12 is forcibly cooled (Step S302).

The controller 11 determines whether a specified condition (described later) is met in the fuel cell system 100 (Step S303). If the specified condition is satisfied ("Yes" in Step S303), the material gas of the material feed pipeline G1 is injected into the anode 13a, the cathode 13c and the hydrogen generator 12 under the supply pressure of the material gas supply source so as to maintain the inside of the anode 13a, the cathode 13c and the hydrogen generator 12 at least a positive pressure or atmospheric pressure. Thus, the pressurizing operation is executed, thereby preventing negative pressure generation within the anode 13a, cathode 13c and hydrogen generator 12 owing to the dew condensation of vapor existing in the anode 13a, cathode 13c and hydrogen generator 12. Subsequently to the internal pressurizing operation, the anode 13a, the cathode 13c and the hydrogen generator 12 are again sealed off (Step S304) and then, the shutdown process proceeds to the determination step S305.

On the other hand, if the specified condition is not satisfied ("No" in Step S305), the shutdown process proceeds to the next determination step S305 without executing the material gas injecting process described in Step S304.

Here, a check is made to determine whether the inside of the fuel cell system 100 is sufficiently cooled (Step S305), and if cooling is insufficient ("No" in Step S305), the shutdown process returns to Step 302 to repeat the operation of Step S302 and the subsequent steps. If cooling is satisfactorily done ("Yes" in Step S305), the forcible cooling operation of the hydrogen generator 12 by heat exchange with the air coming from the first blower 16 is stopped (Step S306), and the special shutdown operation of the fuel cell system 100 for coping with the failure of the material gas flow meter 31 is completed.

One example of the operation of the fuel cell system 100 based on "the specified condition" stated in Step S303 is as follows: The controller 11 executes valve operation in Step S304 such that the material gas is injected into the anode 13a, the cathode 13c and the hydrogen generator 12 under the supply pressure of the material gas supply source at specified time intervals while monitoring, with a proper timer device (not shown), an elapse of specified time after the fuel cell system 100 stops.

Figure 4:
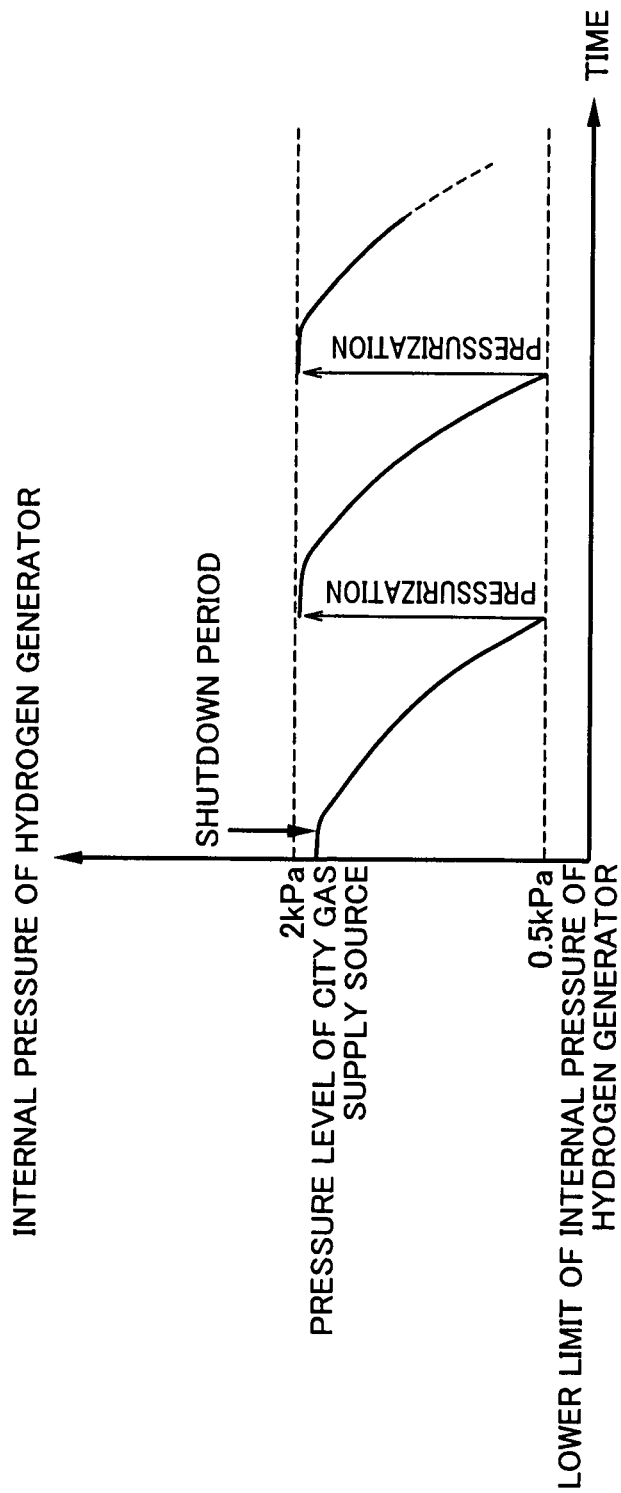
FIG. 4 is a graph showing one example of pressurization in a hydrogen generator.

Another example of the operation of the fuel cell system 100 based on "the specified condition" stated in Step S303 is as follows: Based on a pressure value detected by the second pressure detecting device 32 for measuring the internal pressure of the hydrogen generator 12, a check is made to determine whether the measured internal pressure of the hydrogen generator 12 has reached the lower limit (e.g., 0.5 kPa) of the internal pressure of the hydrogen generator 12, as shown in FIG. 4. At the time the measured value has reached the lower limit, the controller 11 performs control such that the material gas of the material feed pipeline G1 is injected into the anode 13a, cathode 13c and hydrogen generator 12 through the valve operation of Step S304 under the supply pressure of the material gas supply source, so that the internal pressure of the hydrogen generator 12 rises to the level equivalent to the supply pressure of city gas (about 2 kPa) (at the same time, the internal pressures of the anode 13a and the cathode 13c rise to an appropriate pressure level).

Incidentally, the temperature of the hydrogen generator 12 drops more rapidly than the temperature of the fuel cell 13. Therefore, if the internal pressure of the hydrogen generator 12 is found to be maintained at least a positive pressure or atmospheric pressure (0.5 kPa or more in this embodiment) by monitoring its measured values, it can be deduced that the internal pressure of the fuel cell 13 is also maintained at least a positive pressure or atmospheric pressure.

Another example of the operation of the fuel cell system 100 based on "the specified condition" stated in Step S303 is as follows: The controller 11 detects a drop in the internal gas temperature of the hydrogen generator 12 based on values detected by the first temperature detecting device 33 for measuring the internal gas temperature of the hydrogen generator 12. Each time temperature drops by, for instance, 50° C., the material gas is injected from the material feed pipeline G1 into the anode 13a, the cathode 13c and the hydrogen generator 12 through the valve operation of Step S304 under the supply pressure of the material gas supply source, so that the internal pressure of the hydrogen generator 12 rises to the level equivalent to the supply pressure of city gas (about 2 kPa) (at the same time, the internal pressures of the anode 13a and the cathode 13c rise to an appropriate level).

A further example of the operation of the fuel cell system 100 based on "the specified condition" stated in Step S303 is as follows: The controller 11 detects a drop in the internal gas temperature of the fuel cell 13 based on values detected by the second temperature detecting device 35 for predicting the internal gas temperature of the fuel cell 13. Each time temperature drops by, for instance, 5° C., the material gas is injected from the material feed pipeline G1 into the anode 13a, the cathode 13c and the hydrogen generator 12 through the valve operation of Step S304 under the supply pressure of the material gas supply source, so that the internal pressure of the hydrogen generator 12 rises to the level equivalent to the supply pressure of city gas (about 2 kPa) (at the same time, the internal pressures of the anode 13a and the cathode 13c rise to an appropriate level).

By measuring the internal gas temperature of the hydrogen generator 12 and the internal gas temperature of the fuel cell 13, the controller 11 can make comparisons between these measured temperatures and the dew points of the internal gases and can predict the decreasing volumes of the gases existing in the hydrogen generator 12 and the fuel cell 13. Therefore, the controller 11 can control the fuel cell system 100 so as to maintain the inside of the hydrogen generator 12 and the fuel cell 13 at least a positive pressure or atmospheric pressure (e.g., 0.5 kPa or more) by effectively making use of the internal gas temperature of the hydrogen generator 12 and the internal gas temperature of the fuel cell 13.

In the shutdown operation of the fuel cell system, in the event of failure of the material gas flow meter 31, the material gas is properly injected into the anode 13a, the cathode 13c and the hydrogen generator 12, thereby preventing negative pressure generation within these components. This prevents the oxidative degradation of the catalysts of the hydrogen generator 12 and others which occurs when external air leaks into these components owing to internal negative pressure.

Although the gas sealing section of the fuel cell system 100 will break down if the internal pressure of the fuel cell system 100 becomes negative to a significant degree stepping over the guaranteed pressure resistance (e.g., 20 kPa that is equivalent to a pressure difference relative to atmospheric pressure) of the fuel cell system 100, the above-described operation can prevent damage to the gas sealing section of the fuel cell system 100.

Further, in cases where a city gas supply source for household purposes is used as the material gas supply source 10a, the negative pressure generation within the fuel cell system 100 causes city gas to be drawn into the fuel cell system 100, which may adversely affect home gas appliances. However, the above operation can prevent such an adverse effect on the home gas appliances.

If a failure occurs in the material gas flow meter 31, the hydrogen generator 12 and the cathode 13c cannot be purged with the material gas so that the dew condensation of a large amount of vapor existing in the hydrogen generator 12 and the cathode 13c is likely to cause negative pressure generation within the hydrogen generator 12 and the cathode 13c. Therefore, the negative pressure generation preventing effect achieved by the injection of the material gas, which has been explained in Step S304, is remarkable especially during the special shutdown operation performed in the event of failure of the material gas flow meter 31.

[Modification 1 of the Special Shutdown Operation of the Fuel Cell System Shown in FIG. 3]

While the special shutdown operation of the fuel cell system 100 has been described with a case where a failure occurs in the material gas flow meter 31, the special shutdown operation of the fuel cell system 100 shown in FIG. 3 is not executed only in such an occasion.

If the inside of the hydrogen generator 12 and the cathode 13c is purged with the material gas in cases where the inflammable gas containing the material gas after purging cannot be combusted nor discharged (i.e., a case where post treatment of the gas after the purging process is impossible), because of failure of the heating combustor 18 such as accidental fire of the heating combustor 18, the unburned inflammable gas (material gas) will be released to the atmosphere.

Therefore, the controller 11 monitors data output from the combustion detecting device 34 to check whether or not an abnormality has occurred in the combusting condition of the heating combustor 18. If a combustion abnormality such as accidental fire has occurred in the heating combustor 18, the controller 11 controls the operation of the valves so as to start the special shutdown operation of the fuel cell system shown in FIG. 3 without executing the normal shutdown operation of the fuel cell system 100 shown in FIG. 2. With the special shutdown operation, even if a combustion abnormality such as accidental fire occurs in the heating combustor 18, discharge of unburned inflammable gas to the atmosphere can be avoided. At the same time, internal negative pressure generation in the anode 13a, cathode 13c and hydrogen generator 12 can be prevented.

[Modification 2 of the Special Shutdown Operation of the Fuel Cell System Shown in FIG. 3]

While there has been described a case where during the shutdown operation of the fuel cell system 100, pressurization is executed by injecting the material gas of the material feed pipeline G1 into the anode 13a, cathode 13c and hydrogen generator 12 under the supply pressure of the material gas supply source to maintain the inside of the anode 13a, cathode 13c and hydrogen generator 12 at least a positive pressure or atmospheric pressure, the technique of internal pressurization of the anode 13a etc. by injection of the material gas is applicable during a stand-by period of the fuel cell system 100 after shutdown operation.

For example, the pressurizing operation may be executed in the following way: If the controller 11 determines, during a stand-by period of the fuel cell system 100 after shutdown operation, that a specified condition is satisfied (such as when the internal pressure of the hydrogen generator 12 drops, reaching its lower limit) in the fuel cell system 100, the material gas of the material feed pipeline G1 is injected into the anode 13a, cathode 13c and hydrogen generator 12 under the supply pressure of the material gas supply source to prevent internal negative pressure generation in the anode 13a, cathode 13c and hydrogen generator 12, so that the inside of the anode 13a, cathode 13c and hydrogen generator 12 is maintained at least a positive pressure or atmospheric pressure.

[Example of the Shutdown Operation of the Fuel Cell System (Special Shutdown Performed in the Event of Interruption of Supply Pressure from the Material Gas Supply Source]

Figure 5:
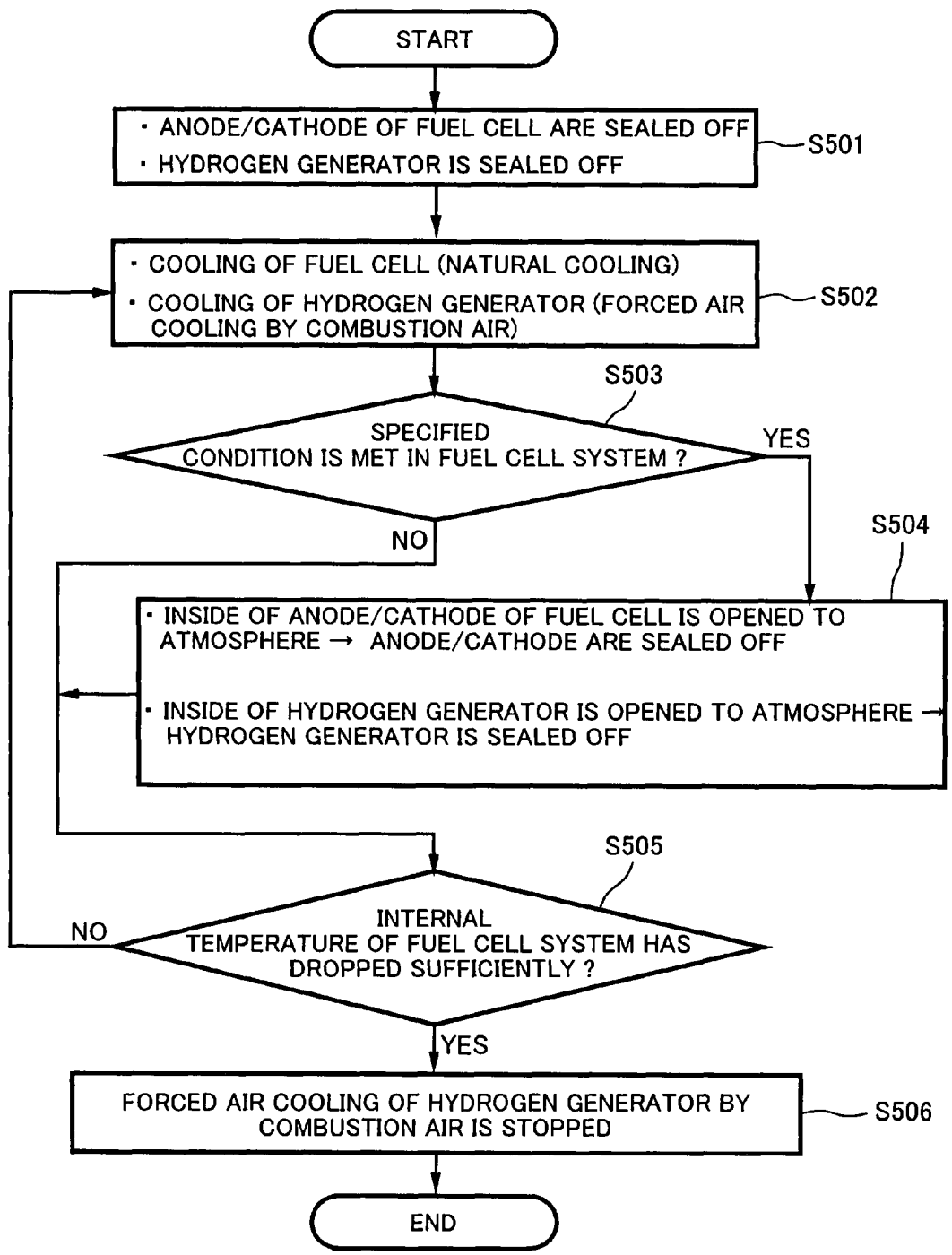
FIG. 5 is a flow chart that shows an example of the special shutdown operation performed in the event of interruption of supply pressure from a material gas supply source in the fuel cell system according to the embodiment.

FIG. 5 is a flow chart that shows an example of the special shutdown operation performed in the event of interruption of supply pressure from the material gas supply source in the fuel cell system according to the embodiment.

Based on a pressure value output from the first pressure detecting device 30 for measuring the supply pressure of the material gas supply source, the controller 11 determines whether or not the special shutdown operation for coping with interruption of the supply pressure of the material gas supply source of the fuel cell system 100 (interruption of the supply of the material gas) is to be executed by controlling the valves associated with Steps S501 to 506 shown in FIG. 5.

More specifically, if the pressure detected by the first pressure detecting device 30 exceeds a specified threshold, the controller 11 executes normal shutdown (see FIG. 2) of fuel cell system 100 or the special shutdown (see FIG. 3) of the fuel cell system 100 for coping with failure of the material gas flow meter 31. If the pressure detected by the first pressure detecting device 30 becomes equal to or less than specified threshold, the controller 11 executes special shutdown (see FIG. 5) of the fuel cell system 100 for coping with interruption of supply pressure from the material gas supply source.

It should be noted the specified threshold as stated herein is the supply pressure of the material gas supply source that is required for at least preventing negative pressure generation within the hydrogen generator 12 etc. In this embodiment, the lower limit (0.5 kPa) of the internal pressure of the hydrogen generator 12 shown in FIG. 4 is used as the specified threshold.

In this case, the purging process for purging the inside of the cathode 13c and hydrogen generator 12 with the material gas and the process for injecting the material gas into the anode 13a, cathode 13c and hydrogen generator 12 to prevent negative pressure generation therein are omitted as seen from the flow chart of FIG. 5, because supply of the material gas per se is impossible during special shutdown of the fuel cell system 100 executed in the event of interruption of supply pressure from the material gas supply source. Instead of these processes, a process for opening the inside of the anode 13a, cathode 13c and hydrogen generator 12 to the atmosphere is executed if the specified condition is satisfied in the fuel cell system 100.

The operation for sealing off the outlets/inlets of the anode 13a, cathode 13c and hydrogen generator 12 does not differ from the operation already described above and therefore a detailed explanation of the valve operation for sealing them is omitted herein.

After the fuel cell system 100 enters a shutdown process such as a stop of the power generating operation of the fuel cell 13 or a stop of the combusting operation of the heating combustor 18, the outlets/inlets of the anode 13a and cathode 13c of the fuel cell 13 as well as the outlet/inlet of the hydrogen generator 12 are sealed off (Step S501).

While the fuel cell 13 is allowed to cool (natural cooling), air is fed from the first blower 16 for combustion air supply to the heating combustor 18 and the hydrogen generator 12 exchanges heat with this air so that the hydrogen generator 12 is forcibly cooled (Step S502).

The controller 11 determines whether the fuel cell system 100 meets a specified condition (described later) (Step S503). If the specified condition is satisfied ("Yes" in Step S503), the anode 13a, the cathode 13c and the hydrogen generator 12 are temporarily opened to the atmosphere in order to avoid excessive negative pressure generation within the anode 13a, the cathode 13c and the hydrogen generator 12 due to dew condensation of vapor existing therein. After opened to the atmosphere, the anode 13a, the cathode 13c and the hydrogen generator 12 are again sealed off (Step S504) and then, the shutdown process proceeds to the determination step S505.

More specifically, when the outlet and inlet of the cathode 13c are sealed off, the fourth three-way valve 28 is temporarily switched so as to establish communication between the outlet of the cathode 13c and the atmosphere (while shutting off communication between the outlet of the cathode 13c and the fourth two-way valve 27) and the cathode 13c is not communicated with the material feed pipeline G1 but communicated with the atmosphere through its outlet (the third state). Accordingly, the cathode 13c is opened to the atmosphere.

In the condition where the outlets/inlets of the anode 13a and the hydrogen generator 12 are sealed off, the second and third two-way valves 26, 22 are temporarily opened and the anode 13a and the hydrogen generator 12 are not communicated with the material feed pipeline G1 but communicated with the atmosphere through their outlets (the third state), so that the anode 13a and the hydrogen generator 12 are opened to the atmosphere through an exhaust gas passage (not shown) of the heating combustor 18.

During the period when the forth third-way valve 28 is temporarily switched so as to establish communication between the outlet of the cathode 13c and the atmosphere, the cathode 13c, the inside of which is in a negative pressure condition, suctions external air so that the negative pressure condition of the cathode 13c is properly terminated.

During the period when the second and third two-way valves 26, 22 are temporarily opened, the anode 13a and hydrogen generator 12, the inside of which is in the negative pressure condition, suction external air so that the negative pressure condition of the anode 13a and hydrogen generator 12 is properly terminated.

One example of the operation of the fuel cell system 100 based on "the specified condition" stated in Step S503 is as follows: The controller 11 receives a pressure value detected by the second pressure detecting device 32 for measuring the internal pressure of the hydrogen generator 12. At the time when the controller 11 determines based on the above value that the measured internal pressure of the hydrogen generator 12 has reached a specified negative pressure level, the controller 11 controls the valves in Step S504 to open the anode 13a, the cathode 13c and the hydrogen generator 12 to the atmosphere.

If the negative pressure level of the hydrogen generator 12 steps over the guaranteed pressure resistance (e.g., 20 kPa that is equivalent to a pressure difference relative to atmospheric pressure) of the fuel cell system 100, the components of the fuel cell system 100 will break down. For this reason, the negative pressure level (which is a numerical value judged under a specified condition) of the hydrogen generator 12 should be lower than the guaranteed pressure resistance (20 kPa).

Incidentally, the temperature of the hydrogen generator 12 drops more rapidly than the temperature of the fuel cell 13. Therefore, if it is found by monitoring measured values that the internal pressure of the hydrogen generator 12 does not step over the guaranteed pressure resistance, it can be deduced that the internal pressure of the fuel cell 13 does not step over the guaranteed pressure resistance.

On the other hand, if the specified condition is not satisfied ("No" in Step S503), the shutdown process proceeds to the next determination step S505 without executing the material gas injecting process described in Step S304.

Here, a check is made to determine whether the inside of the fuel cell system 100 has been sufficiently cooled (Step S505), and if cooling is insufficient ("No" in Step S505), the shutdown process returns to Step 502 to repeat the operation of Step S502 and the subsequent steps. If cooling is satisfactorily done ("Yes" in Step S505), the forcible cooling operation of the hydrogen generator 12 by heat exchange with the air coming from the first blower 16 is stopped (Step S506), and the special shutdown operation of the fuel cell system 100 for coping with interruption of supply pressure from the material gas supply source is completed.

In the shutdown operation of the fuel cell system, in the event of interruption of supply pressure from the material gas supply source, the anode 13a, the cathode 13c and the hydrogen generator 12 are opened to the atmosphere, thereby preventing excessive negative pressure generation within these components without fail. This prevents negative pressure generation stepping over the guaranteed pressure resistance (e.g., 20 kPa that is equivalent to a pressure difference relative to atmospheric pressure) of the fuel cell system 100, so that damage to the gas sealing section of the fuel cell system 100 can be avoided.

Further, in cases where a city gas supply source for household purposes is used as the material gas supply source 10a, the negative internal pressure generation within the fuel cell system 100 causes city gas to be drawn into the fuel cell system 100, which may adversely affect gas appliances. However, the above operation can prevent such an adverse effect on the gas appliances.

When executing the above-described shutdown operation of the fuel cell system, the anode 13a, the cathode 13c and the hydrogen generator 12 are once exposed to the atmosphere and therefore, oxidative degradation of the catalysts of these components may occur. However, the oxidative degradation of the catalysts of the anode 13a, the cathode 13c and the hydrogen generator 12 can be properly restrained by properly controlling the time taken for exposing the catalysts to the atmosphere and the number of times the catalysts are exposed to the atmosphere.

In view of this, the demerit of the exposure of the anode 13a, the cathode 13c and the hydrogen generator 12 to the atmosphere (the possible oxidative degradation of the catalysts) is thought to be more negligible than the merit of the prevention of negative pressure generation (the prevention of the damage to the gas sealing section of the fuel cell system 100).

Interruption of supply pressure from the material gas supply source makes it impossible to purge the hydrogen generator 12 and the cathode 13c with the material gas. In this situation, negative pressure generation is likely to progress within the hydrogen generator 12 and the cathode 13c owing to dew condensation of vapor that exists in large amounts in the hydrogen generator 12 and the cathode 13c. In view of this, the negative pressure generation preventing effect obtained by the release of the material gas described in Step S504 is remarkable especially when performing the special shutdown operation for coping with interruption of supply pressure from the material gas supply source.

[Modification 1 of the Special Shutdown Operation of the Fuel Cell System Shown in FIG. 5]

While the special shutdown operation of the fuel cell system 100 in the event of interruption of supply pressure from the material gas supply source has been described, the operation of exposing the hydrogen generator 12 to the atmosphere described in Step S504 of FIG. 5 is applicable not only to such a situation but also to other situations.

Figure 6:
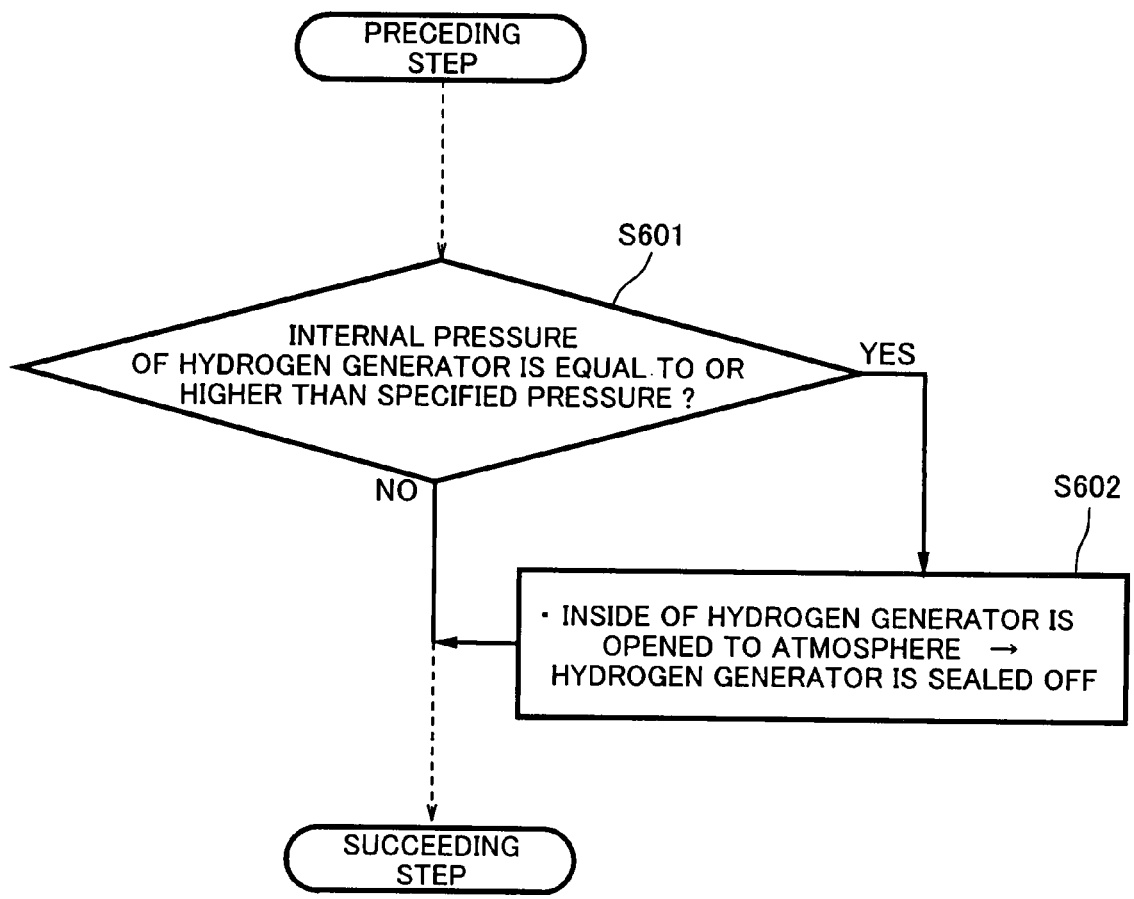
FIG. 6 is a flow chart that shows a modification of the special fuel cell system shutdown operation shown in FIG. 5.

FIG. 6 is a flow chart that shows a modification of the special fuel cell system shutdown operation shown in FIG. 5. In this modification, Steps S601 and S602 are performed in place of Steps S503 and S504 of FIG. 5. Except this, the preceding step and the succeeding step shown in FIG. 6 do not differ from the operation of the steps shown in FIG. 5, and therefore a detailed illustration and description of the same steps as of the operation shown in FIG. 5 is omitted herein.

During shutdown of the fuel cell system 100, a high temperature region and a low temperature region coexist in an uneven manner. Therefore, vapor existing in the low temperature region (which is the pipeline connected to the hydrogen generator 12 in this modification) of the fuel cell system 100 condenses, forming dew and this condensed water flows into the high temperature region of the fuel cell system 100 (i.e., into the hydrogen generator 12 in this modification) and instantly evaporates in some cases. Within the hydrogen generator 12, the evaporation of the condensed water causes volume expansion and therefore excessive positive pressure generation. In the worst case, the pressure within the hydrogen generator 12 may exceed the guaranteed pressure resistance of the fuel cell system 100.

To solve this problem, in FIG. 6, the controller 11 determines, based on a pressure value output from the second pressure detecting device 32 for measuring the internal pressure of the hydrogen generator 12, whether or not the internal pressure of the hydrogen generator 12 is not lower than a specified pressure (e.g., the guaranteed pressure resistance equivalent to a differential pressure of 20 kPa relative to atmospheric pressure) (Step S601).

If the internal pressure of the hydrogen generator 12 has reached this specified pressure ("Yes" in Step S601), the inside of the hydrogen generator 12 is temporarily opened to the atmosphere and, then, the outlet and inlet of the hydrogen generator 12 are sealed off (Step S602) and the shutdown process proceeds to the next step.

The valve operation for opening the hydrogen generator 12 to the atmosphere and the valve operation for sealing off the outlet and inlet of the hydrogen generator 12 do not differ from those described earlier and therefore a description of these valve operations is omitted.

In the shutdown operation of the fuel cell system, even if the internal pressure of the hydrogen generator 12 becomes excessively positive owing to evaporation of the condensed water, the internal pressure of the hydrogen generator 12 will not rise exceeding the guaranteed pressure resistance of the fuel cell system 100 so that damage to the gas sealing section of the fuel cell system 100 can be prevented.

[Modification 2 of the Special Shutdown Operation of the Fuel Cell System Shown in FIG. 5]

While the embodiment has been described with the case where the anode 13a, the cathode 13c and the hydrogen generator 12 are temporarily opened to the atmosphere during shutdown operation of the fuel cell system 100 in order to prevent negative pressure generation in the anode 13a, the cathode 13c and the hydrogen generator 12, the technique for preventing negative pressure generation in the anode 13a etc. by opening to the atmosphere is applicable during a stand-by period of the fuel cell system 100 after shutdown operation.

For instance, this technique is carried out in the following way. During a stand-by period of the fuel cell system 100 after shutdown operation, the controller 11 determines whether or not a specified condition is satisfied (e.g., whether the internal pressure of the hydrogen generator 12 has reached a predetermined negative pressure level) in the fuel cell system 100, and if so, the anode 13a, cathode 13c and hydrogen generator 12 are temporarily opened to the atmosphere in order to prevent negative pressure generation within the anode 13a, the cathode 13c and the hydrogen generator 12.

[Embodiment of the Failure Informing Function of the Fuel Cell System 100]

In view of prompt repairing after detecting a failure, it is desirable to provide the fuel cell system 100 with a failure informing function. With this function, a user, a system control center or the like is informed of occurrence of a failure and the contents (type) of the failure at the time when the controller 11 detects an error in the fuel cell system 100 such as, for instance, the failure of the material gas flow meter 31; the interruption of supply pressure from the material gas supply source; or accidental fire etc. in the heating combustor 18 as described earlier. By doing so, not only prolongation of the failed state of the fuel cell system 100 can be restricted but also repair time and repair cost can be saved.

As an example of the failure informing function, the controller 11 may be configured to inform the user of occurrence of a failure through the display unit of a user-operated terminal device (e.g., remote controller) of the fuel cell system 100 or the display device (e.g., LED) of the main unit of the fuel cell system 100, upon receipt of an error signal from the component. This error signal indicates the type of failure occurred (the failure types are described above).

In another example of the failure informing function, the controller 11 includes a wireless apparatus (not shown). If the controller 11 receives an error detection signal from a component when one of the above failures has occurred, the error detection signal is superimposed on wireless carrier waves sent from the wireless apparatus to form a wireless signal which is, in turn, transmitted to a previously registered mobile terminal of the user (e.g., cellular phone) or a previously registered monitor terminal in the system control center. Also, it is possible to send failure information to the system control center through a wired line (such as a telephone line or LAN cable line).

It will become apparent that numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

In the fuel cell system and operation method thereof according to the invention, special shutdown of the fuel cell system is properly performed in the event of occurrence of an abnormality during purging operation by use of material gas. Therefore, the invention has proved useful as, for instance, a fuel cell system for household purposes and its operation method.

The invention claimed is:

1. A fuel cell system comprising:
    a fuel cell for generating electric power, using hydrogen gas at a fuel electrode and oxidizing gas at an oxidant electrode;
    a hydrogen generator for generating the hydrogen gas from a material gas to feed to the fuel electrode;
    an oxidizing gas feeder for feeding the oxidizing gas to the oxidant electrode;
    a first material gas feed passage for guiding the material gas into said hydrogen generator;
    a hydrogen generator opening/closing device for opening and closing the outlet and inlet of said hydrogen generator; and
    a controller for controlling opening and closing of said hydrogen generator opening/closing device,
    wherein, during shutdown operation of said fuel cell system, said controller is configured to bring the opening/closing state of said hydrogen generator opening/closing device into a first state where the inside of said hydrogen generator is communicated with said first material gas feed passage through the inlet thereof and the atmosphere through the outlet thereof so as to allow a through-flow of the material gas, such that the inside of said hydrogen generator in the first state is purged with the material gas of said first material gas feed passage; and
    said controller is configured to bring the opening/closing state of said hydrogen generator opening/closing device into a second state where the inside of said hydrogen generator is not communicated with the atmosphere through the outlet thereof but communicated with said first material gas feed passage through the inlet thereof, such that the inside of said hydrogen generator in the second state is maintained at a positive pressure or atmospheric pressure by injecting the material gas of said first material gas feed passage thereinto, and
    wherein when an abnormality occurs in the purging process with the material gas, said controller is configured to bring the opening/closing state of said hydrogen generator opening/closing device into a state different from the first state according to the contents of the abnormality, such that the inside of said hydrogen generator is maintained at a positive pressure or atmospheric pressure.

2. The fuel cell system according to claim 1, wherein when an abnormality in the purging process with the material gas is a failure to measure the amount of the material gas within said first material gas feed passage or a failure in posttreatment of gas after the purging process, said controller is configured to bring the opening/closing state said hydrogen generator opening/closing device into the second state, such that the inside of said hydrogen generator in the second state is maintained at a positive pressure or atmospheric pressure by injecting the material gas of said first material gas feed passage thereinto.

3. The fuel cell system according to claim 1, wherein when an abnormality in the purging process with the material gas is a failure to supply the material gas of said first material gas feed passage, said controller is configured to bring the opening/closing state of said hydrogen generator opening/closing device into a third state where the inside of said hydrogen generator is not communicated with said first material gas feed passage through the inlet thereof but communicated with the atmosphere through the outlet thereof, such that the inside of said hydrogen generator in the third state is opened to the atmosphere.

4. The fuel cell system according to claim 2, further comprising a first temperature detecting device for detecting the temperature of said hydrogen generator,
wherein said controller is configured to maintain, based on the temperature detected by said first temperature detecting device, the inside of said hydrogen generator at a positive pressure or atmospheric pressure by injecting the material gas of said first material gas feed passage thereinto.

5. The fuel cell system according to claim 2, further comprising a second temperature detecting device for detecting the temperature of said fuel cell,
wherein said controller is configured to maintain, based on the temperature detected by said second temperature detecting device, the inside of said hydrogen generator at a positive pressure or atmospheric pressure by injecting the material gas of said first material gas feed passage thereinto.

6. The fuel cell system according to claim 2, further comprising a first pressure detecting device for detecting the pressure of said hydrogen generator,
wherein said controller is configured to maintain, based on the pressure detected by said first pressure detecting device, the inside of said hydrogen generator at a positive pressure or atmospheric pressure by injecting the material gas of said first material gas feed passage thereinto.

7. The fuel cell system according claim 3, further comprising a first pressure detecting device for detecting the pressure of said hydrogen generator,
wherein said controller is configured to open the inside of said hydrogen generator to the atmosphere if the pressure detected by said first pressure detecting device steps over a specified threshold after the outlet and/or inlet of said hydrogen generator is sealed off.

8. The fuel cell system according to claim 2, further comprising a heating combustor for heating said hydrogen generator through heat exchange with combustion gas and an air feeding device for supplying said heating combustor with air to be used for generating the combustion gas,
wherein during shutdown operation of said fuel cell system, said controller is configured to maintain the inside of said hydrogen generator at a positive pressure or atmospheric pressure, by injecting the material gas of said first material gas feed passage thereinto, while controlling said air feeding device after stopping combustion gas generation in said heating combustor such that said hydrogen generator is cooled down through heat exchange with air.

9. The fuel cell system according to claim 2, further comprising a second pressure detecting device for detecting supply pressure for the material gas of said first material gas feed passage,
wherein if the pressure detected by said second pressure detecting device is equal to or higher than a specified threshold, said controller is configured to maintain the inside of said hydrogen generator at a positive pressure or atmospheric pressure by injecting the material gas of said first material gas feed passage thereinto.

10. The fuel cell system according to claim 3, further comprising a second pressure detecting device for detecting supply pressure for the material gas of said first material gas feed passage,
wherein if the pressure detected by said second pressure detecting device is lower than a specified threshold, said controller is configured to open the inside of said hydrogen generator to the atmosphere.

11. The fuel cell system according to claim 2, wherein during a stand-by period of the fuel cell system after shutdown operation, said controller is configured to maintain the inside of said hydrogen generator at a positive pressure or atmospheric pressure by injecting the material gas of said first material gas feed passage thereinto.

12. The fuel cell system according to claim 3, wherein during a stand-by period of the fuel cell system after shutdown operation, said controller is configured to open the inside of said hydrogen to the atmosphere.

13. A method for operating a fuel cell system which comprises:
a fuel cell for generating electric power, using hydrogen gas at a fuel electrode and oxidizing gas at an oxidant electrode;
a hydrogen generator for generating the hydrogen gas from a material gas to feed to the fuel electrode;
an oxidizing gas feeder for feeding the oxidizing gas to the oxidant electrode;
a first material gas feed passage for guiding the material gas into said hydrogen generator; and
a hydrogen generator opening/closing device for opening and closing the outlet and inlet of said hydrogen generator,
wherein, during shutdown operation of said fuel cell system, the opening/closing state of said hydrogen generator opening/closing device is brought into a first state where the inside of said hydrogen generator is communicated with said first material gas feed passage through the inlet thereof and the atmosphere through the outlet thereof so as to allow a through-flow of the material gas, such that the inside of said hydrogen generator in the first state is purged with the material gas of said first material gas feed passage, and
the opening/closing state of said hydrogen generator opening/closing device is brought into a second state where the inside of said hydrogen generator is not communicated with the atmosphere through the outlet thereof but communicated with said first material gas feed passage through the inlet thereof, such that the inside of said hydrogen generator in the second state is maintained at a positive pressure or atmospheric pressure by injecting the material gas of said first material gas feed passage thereinto, and
wherein when an abnormality occurs in the purging process with the material gas, the opening/closing state of said hydrogen generator opening/closing device is brought into a state different from the first state according to the contents of the abnormality, such that the inside of said hydrogen generator is maintained at a positive pressure or atmospheric pressure.

14. The fuel cell system operating method according to claim 13, wherein if the abnormality in the purging process with the material gas is a failure to measure the amount of the material gas within said first material gas feed passage or a failure in posttreatment of gas after the purging process, the opening/closing state of said hydrogen generator opening/closing device is brought into the second state, such that the inside of said hydrogen generator in the second state is maintained at a positive pressure or atmospheric pressure by injecting the material gas of said first material gas feed passage thereinto.

15. The fuel cell system operating method according to claim 13, wherein if the abnormality in the purging process with the material gas is a failure to supply the material gas of said first material gas feed passage, the opening/closing state of said hydrogen generator opening/closing device is brought into a third state where the inside of said hydrogen generator is not communicated with said first material gas feed passage through the inlet thereof but communicated with the atmosphere through the outlet thereof, such that the inside of said hydrogen generator in the third state is opened to the atmosphere.

16. The fuel cell system according to claim 1, further comprising:
   a fuel electrode opening/closing device for opening and closing the outlet and inlet of the fuel electrode; and
   a second material gas feed passage for guiding the material gas into the fuel electrode by way of said hydrogen generator;
   wherein, during shutdown operation of said fuel cell system, said controller is configured to bring the opening/closing state of said hydrogen generator opening/closing device into a first state where the inside of said hydrogen generator is communicated with said first material gas feed passage through the inlet thereof and said second material gas feed passage through the outlet thereof so as to allow a through-flow of the material gas;
   said controller is configured to bring the opening/closing state of said fuel electrode opening/closing device into a first state where the inside of the fuel electrode is communicated with said second material gas feed passage through the inlet thereof and atmosphere through the outlet thereof so as to allow a through-flow of the material gas, such that the inside of the fuel electrode in the first state and the inside of said hydrogen generator in the first state are purged with the material gas at a time, using said first and second material gas feed passages; and
   said controller is configured to bring the opening/closing state of said hydrogen generator opening/closing device into a second state where the inside of said hydrogen generator is not communicated with the atmosphere through the outlet thereof but communicated with said first material gas feed passage through the inlet thereof and said second material gas feed passage through the outlet thereof;
   said controller is configured to bring the opening/closing state of said fuel electrode opening/closing device into a second state where the inside of the fuel electrode is not communicated with the atmosphere through the outlet thereof but communicated with said second material gas feed passage through the inlet thereof, such that the inside of the fuel electrode in the second state and the inside of said hydrogen generator in the second state are maintained at a positive pressure or atmospheric pressure by injecting the material gas thereinto at a time, using said first and second material gas feed passages, and
   wherein if an abnormality occurs in the purging process with the material gas, said controller is configured to bring each of the opening/closing state of said fuel electrode opening/closing device and said hydrogen generator opening/closing device into a state different from the first state according to the contents of the abnormality, such that the inside of the fuel electrode and the inside of said hydrogen generator are maintained at a positive pressure or atmospheric pressure.

17. The fuel cell system operating method according to claim 13, wherein said fuel cell system further comprises:
   a fuel electrode opening/closing device for opening and closing the outlet and inlet of the fuel electrode; and
   a second material gas feed passage for guiding the material gas into the fuel electrode by way of said hydrogen generator;
   wherein, during shutdown operation of said fuel cell system, the opening/closing state of said hydrogen generator opening/closing device is brought into a first state where the inside of said hydrogen generator is communicated with said first material gas feed passage through the inlet thereof and said second material gas feed passage through the outlet thereof so as to allow a through-flow of the material gas;
   the opening/closing state of said fuel electrode opening/closing device is brought into a first state where the inside of the fuel electrode is communicated with said second material gas feed passage through the inlet thereof and atmosphere through the outlet thereof so as to allow a through-flow of the material gas, such that the inside of the fuel electrode in the first state and the inside of said hydrogen generator in the first state are purged with the material gas at a time, using said first and second material gas feed passages; and
   the opening/closing state of said hydrogen generator opening/closing device is brought into a second state where the inside of said hydrogen generator is not communicated with the atmosphere through the outlet thereof but communicated with said first material gas feed passage through the inlet thereof and said second material gas feed passage through the outlet thereof;
   the opening/closing state of said fuel electrode opening/closing device is brought into a second state where the inside of the fuel electrode is not communicated with the atmosphere through the outlet thereof but communicated with said second material gas feed passage through the inlet thereof, such that the inside of the fuel electrode in the second state and the inside of said hydrogen generator in the second state are maintained at a positive pressure or atmospheric pressure by injecting the material gas thereinto at a time, using said first and second material gas feed passages, and
   wherein if an abnormality occurs in the purging process with the material gas, each of the opening/closing state of said fuel electrode opening/closing device and said hydrogen generator opening/closing device is brought into a state different from the first state according to the contents of the abnormality, such that the inside of the fuel electrode and the inside of said hydrogen generator are maintained at a positive pressure or atmospheric pressure.

* * * * *